US012670220B2

(12) United States Patent
Hynes et al.

(10) Patent No.: US 12,670,220 B2
(45) Date of Patent: Jun. 30, 2026

(54) SYSTEMS AND METHODS FOR CONCEPTUAL HIGHLIGHTING OF DOCUMENT SEARCH RESULTS

(71) Applicant: RELATIVITY ODA LLC, Chicago, IL (US)

(72) Inventors: Ryan McGinty Hynes, London (GB); Theo Van Wijk, Chicago, IL (US); Evan McAlpine, Ypsilanti, MI (US); James A. Witte, Jr., Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 78 days.

(21) Appl. No.: 17/945,612

(22) Filed: Sep. 15, 2022

(65) Prior Publication Data

US 2024/0095283 A1 Mar. 21, 2024

(51) Int. Cl.
| | |
|---|---|
| *G06F 16/903* | (2019.01) |
| *G06F 16/9038* | (2019.01) |
| *G06F 16/93* | (2019.01) |
| *G06F 40/103* | (2020.01) |
| *G06F 40/284* | (2020.01) |
| *G06F 40/58* | (2020.01) |

(52) U.S. Cl.
CPC .......... *G06F 16/9038* (2019.01); *G06F 16/93* (2019.01); *G06F 40/103* (2020.01); *G06F 40/284* (2020.01); *G06F 40/58* (2020.01)

(58) Field of Classification Search
None
See application file for complete search history.

(56) References Cited

U.S. PATENT DOCUMENTS

| | | | | |
|---|---|---|---|---|
| 7,672,951 | B1 * | 3/2010 | Bierner ................... | G06F 16/38 |
| | | | | 707/999.01 |
| 8,880,515 | B2 * | 11/2014 | Lamba .............. | G06F 16/24578 |
| | | | | 707/723 |
| 9,201,927 | B1 * | 12/2015 | Zhang ..................... | G06F 40/30 |
| 9,348,920 | B1 * | 5/2016 | Kesin .................... | G06F 16/282 |
| 11,151,608 | B1 * | 10/2021 | Guo ................... | G06Q 30/0277 |
| 11,947,915 | B1 * | 4/2024 | Shen ..................... | G06F 40/247 |

(Continued)

FOREIGN PATENT DOCUMENTS

| | | | | | |
|---|---|---|---|---|---|
| CN | | 113297254 A | * | 8/2021 | ......... G06F 16/2433 |

*Primary Examiner* — Augustine K. Obisesan
(74) *Attorney, Agent, or Firm* — MARSHALL, GERSTEIN & BORUN LLP

(57) ABSTRACT

Systems and methods for performing a conceptual search and highlighting relevant portions of a content item are provided. The methods may include: receiving one or more input concepts from a user device; calculating concept scores for the one or more input concepts for one or more content items; based on the concept scores for the one or more content items, retrieving a set of content items; identifying one or more concept subsections of the content items in the set of content items, wherein a concept subsection is a subsection of a content item that corresponds to a particular input concept of the one or more input concepts; and causing the user device to display a particular content item in the set of content items, wherein the display of the particular content item includes visual indicators associated with the identified one or more concept subsections for the particular content item.

18 Claims, 12 Drawing Sheets

400

Receive One Or More Input Concepts From A User Device ~402

Divide A Content Item Into One Or More Subsections ~404

Determine A Similarity Metric Corresponding To The Input Concept For The One Or More Subsections Of The Content Item ~406

Evaluate The Similarity Metric For The One Or More Subsections Of The Content Item To Generate The Concept Score For The Content Item ~408

Based On The Concept Scores For The One Or More Content Items, Retrieve A Set Of Content Items ~410

Identify One Or More Concept Subsections Of The Content Items In The Set Of Content Items, Wherein A Concept Subsection Is A Subsection Of A Content Item That Corresponds To A Particular Input Concept Of The One Or More Input Concepts ~412

Cause The User Device To Display A Particular Content Item In The Set Of Content Items, Wherein The Display Of The Particular Content Item Includes Visual Indicators Associated With The Identified One Or More Concept Subsections For The Particular Content Item ~414

(56)  References Cited

U.S. PATENT DOCUMENTS

| | | | |
|---|---|---|---|
| 2008/0033932 A1* | 2/2008 | DeLong | G06F 16/951 |
| | | | 707/999.005 |
| 2008/0033982 A1* | 2/2008 | Parikh | G06F 16/31 |
| | | | 707/999.102 |
| 2008/0235162 A1* | 9/2008 | Spring | G10L 15/1822 |
| | | | 706/11 |
| 2009/0198642 A1* | 8/2009 | Akkiraju | G06N 5/02 |
| | | | 706/54 |
| 2014/0172901 A1* | 6/2014 | Shukla | G06F 16/3338 |
| | | | 707/765 |
| 2016/0012106 A1* | 1/2016 | Franceschini | G06F 16/3344 |
| | | | 707/728 |
| 2016/0070782 A1* | 3/2016 | Kannan | G06F 16/94 |
| | | | 707/736 |
| 2017/0235799 A1* | 8/2017 | Miller | G06F 16/332 |
| | | | 707/722 |
| 2017/0242851 A1* | 8/2017 | Suzuki | G06F 16/93 |
| 2018/0365207 A1* | 12/2018 | Saetrom | G06F 40/284 |
| 2021/0342718 A1* | 11/2021 | Park | G06N 20/00 |

* cited by examiner

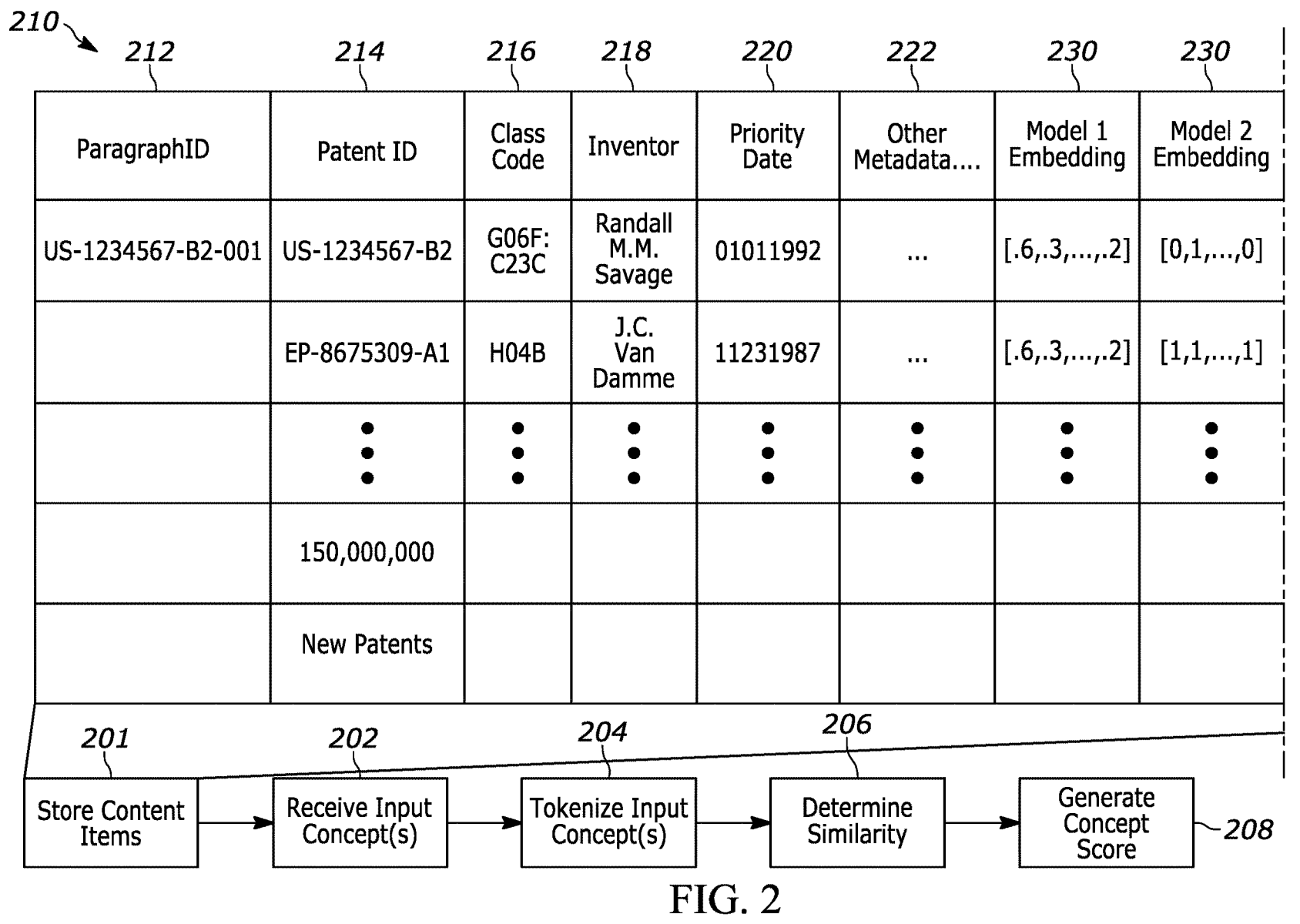

| 212 ParagraphID | 214 Patent ID | 216 Class Code | 218 Inventor | 220 Priority Date | 222 Other Metadata.... | 230 Model 1 Embedding | 230 Model 2 Embedding |
|---|---|---|---|---|---|---|---|
| US-1234567-B2-001 | US-1234567-B2 | G06F: C23C | Randall M.M. Savage | 01011992 | ... | [.6,.3,...,.2] | [0,1,...,0] |
| | EP-8675309-A1 | H04B | J.C. Van Damme | 11231987 | ... | [.6,.3,...,.2] | [1,1,...,1] |
| | • • • | • • • | • • • | • • • | • • • | • • • | • • • |
| | 150,000,000 | | | | | | |
| | New Patents | | | | | | |

210

201 Store Content Items → 202 Receive Input Concept(s) → 204 Tokenize Input Concept(s) → 206 Determine Similarity → 208 Generate Concept Score

FIG. 2

| Target-Patent (Case-Level) Embedding | CPC Embedding | Many Other Models… | New Models |
|---|---|---|---|
| [2.1,.9...,1.6] | [1.3,5.9,...,0.2] | ••• | |
| [7.0,.2...,4.9] | [1.6,1.2,...,8.4] | ••• | |
| ••• | ••• | ••• | |
| | | | |
| | | | |

Per Page |< | < | < |

US-8879886-B2-Descrption 99.78

65.22

65.61

65.61

63.62

74.26

63.99

66.98

67.66

69.08

61.89

63.38

| ⤓ Export | > |

Save Patent

US-20040202218065-A1

[0010]fig. 4 Is A Flow Diagram Of A Method Of Selecting A Personalization Mode Of Device Configuration According To One Embodiment Of The Present Invention; And

[0011]fig. 5 Is A Flow Diagram Of A Method Of Resetting Configuration Options To Their Original Factory Default Settings According To One Embodiment Of The Present Invention.

Detailed Description Of The Preferred Embodiments

[0012]fig. 1 Is A Block Diagram Of The Components Of An Electronic Imaging Device 100 According To One Preferred Embodiment Of The Invention. For Purposes Of Explanation, The Invention Will Be Described With Respect To A Digital Still Image Camera. However, As Explained Above, The Invention Is Not Limited To An Electronic Imaging Device, But Is Equally Applicable To Any Handheld Electronic Device Having Variable Operational Parameter Settings, Such As A Video Recording Device, A Conventional Silver Halide Photographic Film Camera With Electronic Control, A Personal Digital Assistant (PDA), A Pager Or Cellular Telephone, Etc.

[0013]the Camera 100 Includes A Processor 102, Such As A Microprocessor, CPU Or Similar Device Capable Of Executing Mathematical Or Logic Operations On Data In Response To Program Instructions. The Camera Further Includes An Image Sensor Array 104, Such As A CCD (charge-coupled Device) Array, Cmos Sensor Array, Or Equivalent Image Sensing Device; A Lens Assembly 106 For Focusing Light Reflected From A Scene Or Object Of Interest Onto The Image Plane Of The Image Sensor Array 104; A Display 110 Such As An LCD Or Similar Type Display; And A Storage Medium 108.

[0014]for Purposes Of The Invention, The Storage Medium 108 May Include Both Non-volatile Internal Memory And Removable Memory. Furthermore, The Storage Medium 108 May Include Devices Such As Flash Memory, Random Access Memory (ram), Read-only Memory (ROM), Flash Memory, A Memory Stick, Or Similar Solid State Memory For Storing Image Data From The Image Sensor Device (as Well As Secondary Data Relating To Stored Images). The Storage Medium 108 May Additionally Be Employed For Storing Device Operational Programs And Various Operational Parameter Settings, As Will Be Discussed Below In Conjunction With Fig. 2.

[0015]the Camera 100 Further Includes One Or More System Navigation Buttons 114, Such As Arrow Buttons, Scrolling Buttons, Select Buttons, Etc. For Selecting And Using The Various Functional Capabilities Of The Camera, And A Power On/off Button 116. The Camera 100 Would Further Include A Shutter Button (not Shown) For Capturing Images.

[0016]as Shown In Fig. 2, The Storage Medium 108 Includes An Operational Parameters Storage Area 201 For Storing Various Operational Parameter Settings For The Operation Of The Handheld Electronic Device, Including, But Not Specified The Operational Parameters To Be Loaded, The Method May Optionally Perform One Of Several Choices. The Device May Choose A First Set Of Operational Parameters (i.e., The First Occurring Set Of Parameters In The Configuration Mode Storage Area 203). Alternatively, The Device May Load A Most Often Used Set Of Operational Parameters, May Load From Factory Default Settings, Or May Choose To Load A Set Of User-defined Operational Parameters If Only One Such Set Exists (and Load Default Values Otherwise). These Various Optional Selection Steps May Be Performed After The Expiration Of A Predetermined Power-up Initialization Time Period. Therefore, The Device May Take Some Defined Action In A Situation Where The Time Period Has Expired Without A User Selection Occurring.

[0029]at Step 303 B, The User Selects A Personalization Mode Setting Of The Camera, Whereupon A User Identifier Menu Will Be Displayed To The User.

[0030]at Step 304 B, The User Selects A Particular Personalization Identifier, Such As "config 1" For Example.

[0031]at Step 305 B, The User Selects The Various Configuration Option Modifications According To The User's Preference.

[0032]at Step 306 B, The Selected Modifications Are Stored In The Personalization Storage Area 203. Such Settings Are Designated As Values "a1", "a2" Etc., In The Configuration Mode Storage Area 203. Similarly, For Other Configuration Identifiers, Different Values "b", "c" Or "d" Would Be Stored In The Corresponding Configuration Mode Storage Areas 204, 205 Or 206. In This Regard, It Is Noted That Any Configuration Option That Is Not Modified By The User Will Have The Initial Setting Value "f" From The Default Power-on Settings Area 202 Or From The Factory Default Settings Area 218.

[33]fig.     4 Shows A Flow Operation In Which A User Selects A Personalization Mode Setting Upon Power-on Of The Device. At Step 401, The Electronic Imaging Device Is Powered-on.

[0034]at Step 402, The Default Power-on Settings From Storage Area 202 Are Loaded Into The Working Memory Of The Processor.

[0035]at Step 403, The User Selects A Personalization Mode Of The Imaging Device, Using The System Navigation Buttons 114 Or Equivalent User Interface.

[0036]upon Selection Of The Personalization Mode, At Step 404 A List Of Presently Stored Identifiers (either User Identifiers Or Photographic Situation Identifiers) Is Displayed On The Display 110. In Response To This Display, The User Selects A Desired Identifier From Which Corresponding Preferred Camera Configuration Settings Will Be Retrieved.

[0037]at Step 405, The Processor Retrieves The Stored Personalized Configuration Settings Corresponding To The User Identifier Address Selected By The User. For Example FIG. 3C (Continued)

306

Save Patent

US-20040218065-A1

And Loaded Into The Working Memory Of The Processor Of The Electronic Imaging Device. However, Such Default Settings May Not Represent The Optimal Settings For A Particular Photographic Situation, Or The Preferred Settings For A Particular User Of The Device. Consequently, According To The Prior Art, A User Is Required To Manually Select And Change Upon Power-up Each Operational Parameter Whose Default Setting Is Other Than The User's Preferred Setting. Furthermore, According To The Prior Art Only A Select Number Of Configuration Parameters Are Capable Of Being Modified By The User. Still Further, According To The Prior Art, Whenever A Photographic Situation Changes, The User Must Individually Modify Each Operational Parameter That Needs To Be Changed To Conform To The New Photographic Situation. The Same Would Be True When There Are Multiple Users Of The Same Electronic Imaging Device, Such As Multiple Family Members, Etc. Whenever A Different User Desires To Use The Imaging Device, That User Must Manually And Individually Modify The Setting Of Each Of The Operational Parameters To Her Own Preferences.

[0004]there Thus Exists A Need In The Art For Improvements To Handheld Electronic Devices To Eliminate The Shortcomings Mentioned Above.

Summary Of The Invention

[0005]the Present Invention Eliminates The Shortcomings In The Prior Art And Provides A Significant Advance In The Art, By Providing An Improved Handheld Electronic Device.

[0006]specifically, According To One Preferred Embodiment, The Present Invention Provides A Handheld Electronic Device, Such As An Electronic Imaging Device, Including A Processor For Controlling Operation Of Said Handheld Electronic Device According To Program Instructions And Operational Parameter Values; A Storage Medium For Storing Operational Parameter Values, Including A Power-on Storage Area Which Stores Initial Operational Parameter Values That Are Loaded Into A Working Memory Of Said Processor Upon Initial Powering-on Of Said Handheld Electronic Device.

Brief Description Of The Drawings

[0007]fig. 1 Is A Block Diagram Of A Digital Electronic Imaging Device According To A Preferred Embodiment Of The Invention;

[0008]fig. 2 Is A Detail Of A Storage Medium Of The Device Of Fig. 1;

Figure 3A:
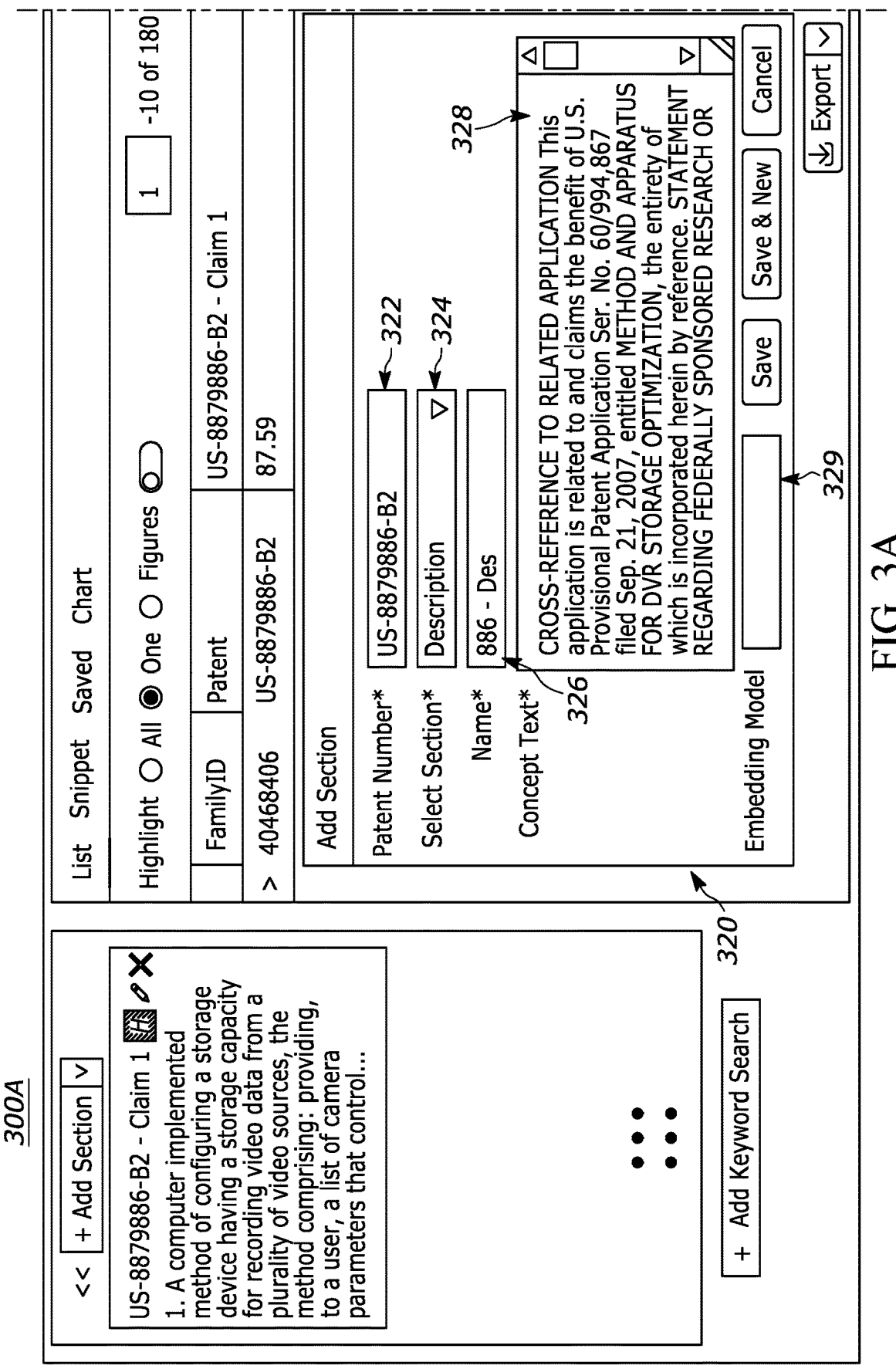
Figure 3A:
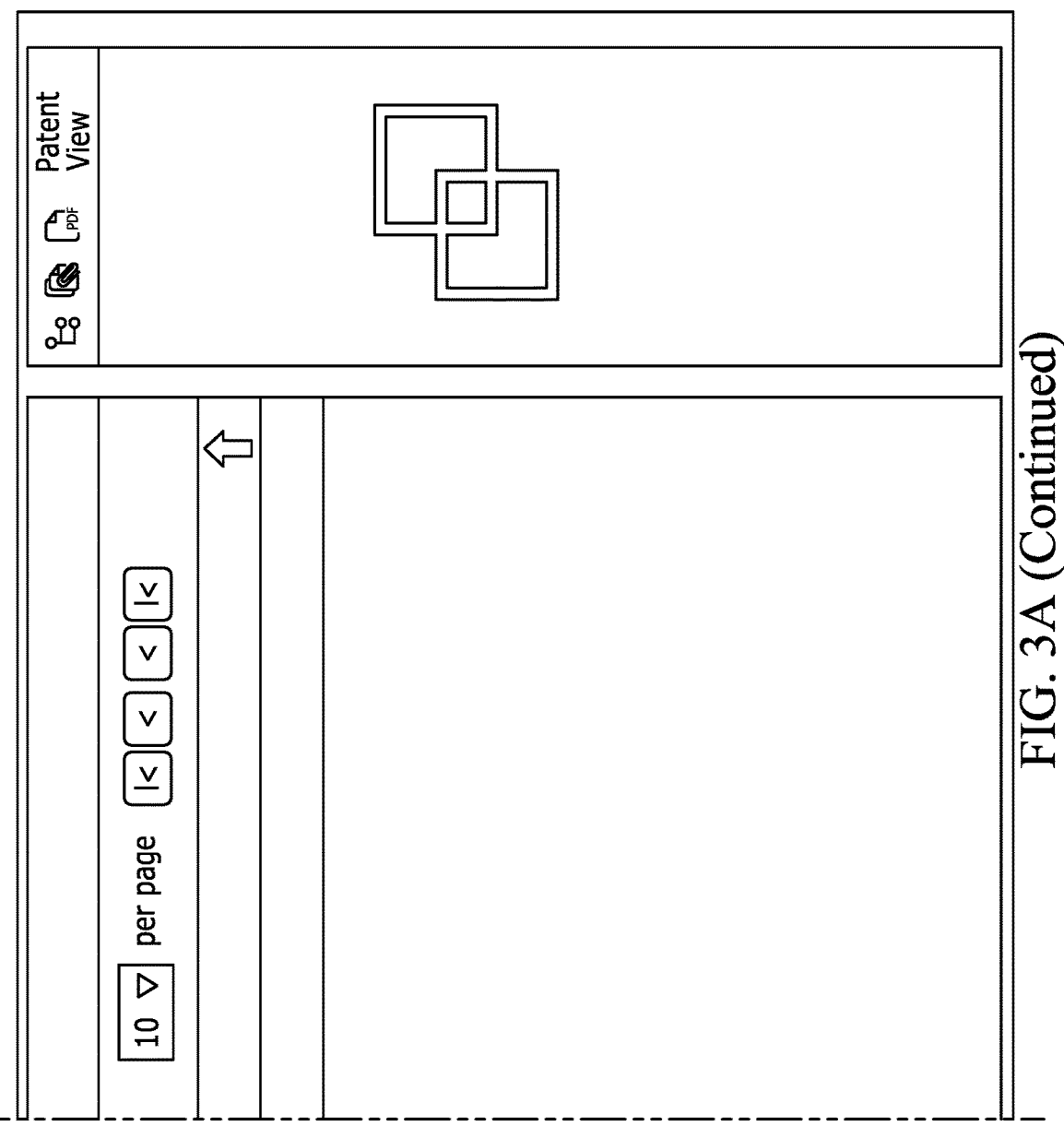
Figure 3B:
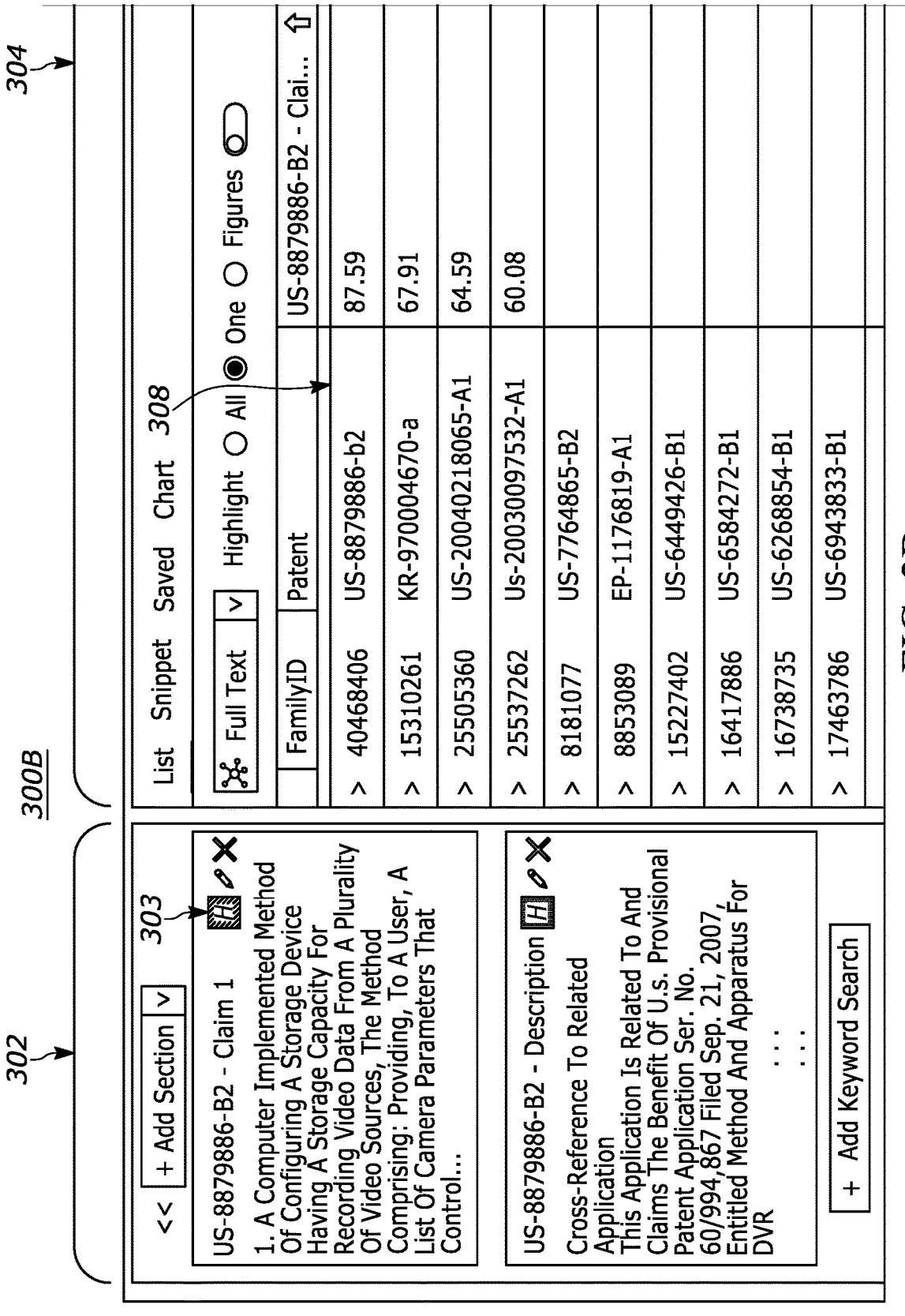
Figure 3B:
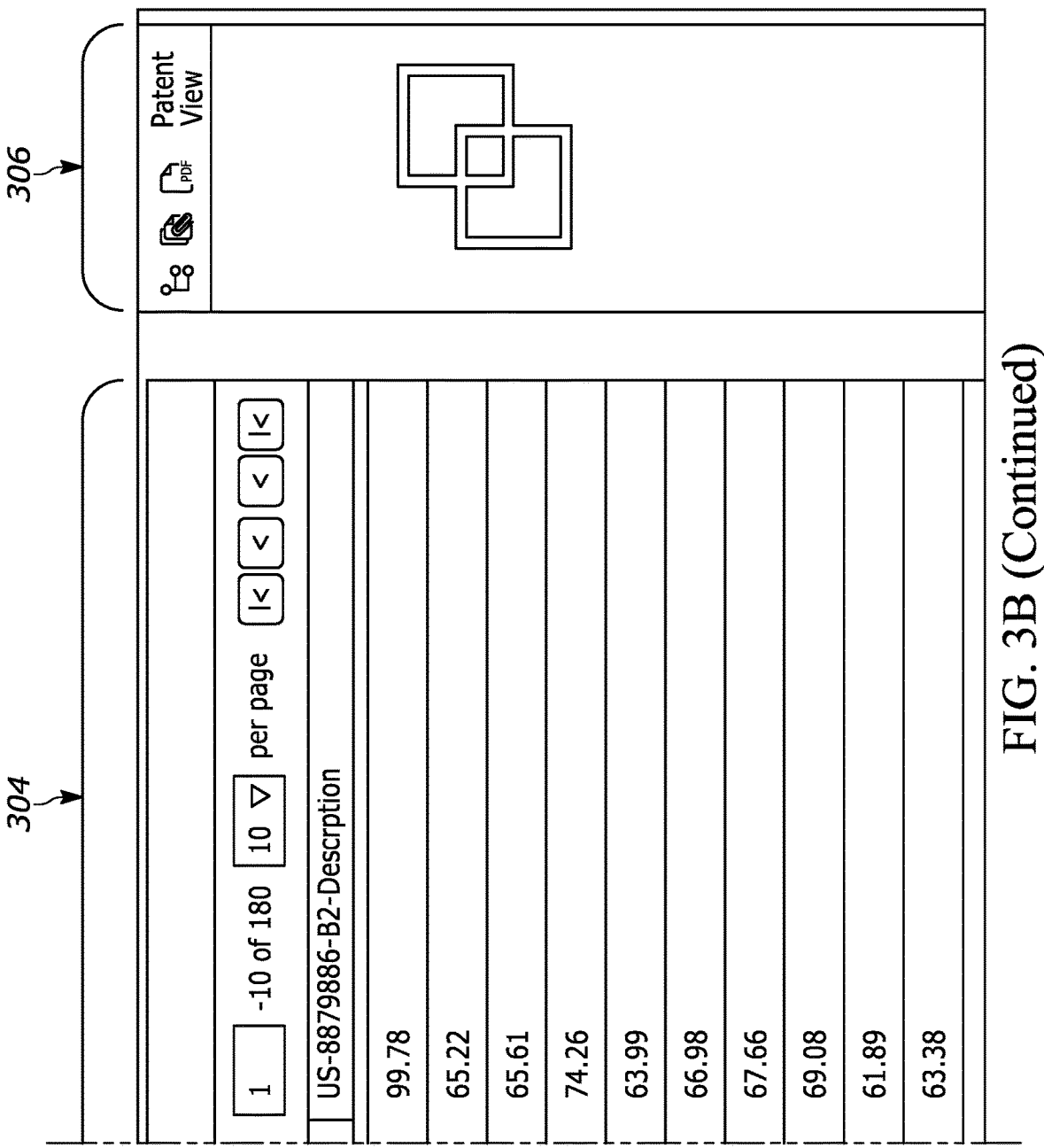

[0009]fig. 3a And 3b Are Flow Diagrams Of Methods Of Making Modifications To Various Device Configuration Option Settings According To One Embodiment Of The Invention;

[0010]fig. 4 Is A Flow Diagram Of A Method Of Selecting A Personalization Mode Of Device Configuration According To One Embodiment Of The Present Invention; And

[0011]fig. 5 Is A Flow Diagram Of A Method Of Resetting Configuration Options To Their Original Factory Default Settings According To One Embodiment Of The Present Invention.

Brief Description Of The Drawings

Figure 1:
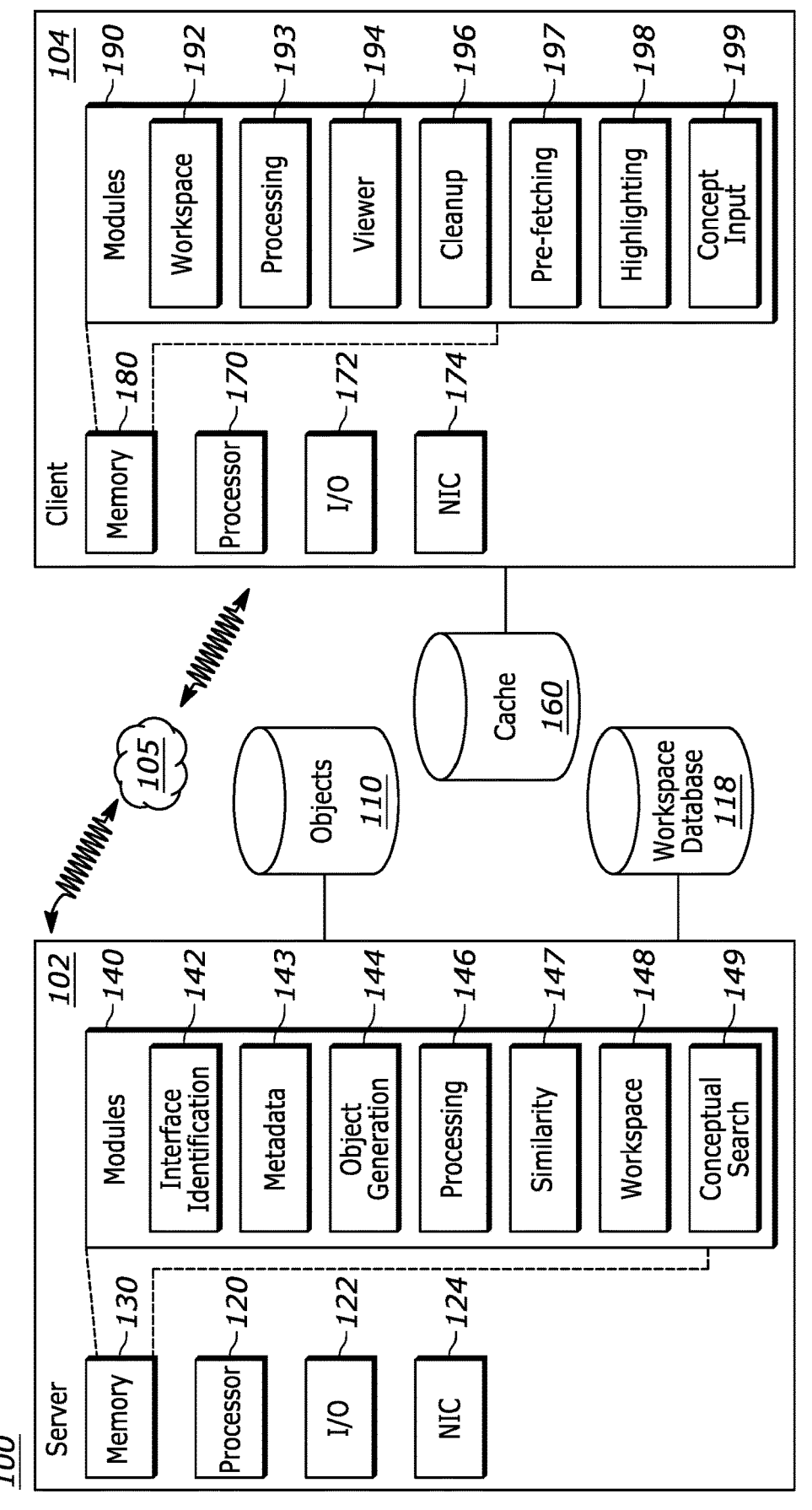

[0012]fig. 1 Is A Block Diagram Of The Components Of An Electronic Imaging Device 100 According To One Preferred Embodiment Of The Invention. For Purposes Of Explanation, The Invention Will Be Described With Respect To A Digital Still Image Camera. However, As Explained Above, The Invention Is Not Internal Memory, While The Image Storage Area 210 May Be Located On A Removable Memory, Such As A Flash Card Or Smart Card. In Yet Another Alternative, All Of The Storage Areas May Be On A Removable Memory, With The Removable Memory Thereby Providing A Portable Personalization Capability To The User.

[0022]according To One Embodiment As Shown In Fig. 3a, At Step 301 A The Device Is Powered-on, Such As By Pressing A Power Button Of The Device.

[0023]after Powering On, The Processor At Step 302 A Retrieves From The Storage Area 202 All Of The Initial Power-on Settings For The Various Camera Configuration Parameters, And Loads The Settings Into Working Memory.

[0024]when A User Desires To Modify Some Or All Of The Initial Power-on Settings, The User At Step 303 A May Select A Parameter Modification Function By Using A Button Or Other Input Device Provided As Part Of The User Interface Or System Navigation Buttons 114. At This Time, A Menu Is Displayed In The Display 110, Allowing The User To Select And Modify The Various Operational Parameters Of The Camera.

[0025]in Step 304 A, The User May Change The Settings By Manipulation Of The System Navigation Buttons, Causing The Desired Settings To Be Displayed In The Display Menu, And Then Select A Displayed Setting To Be Saved In The Memory Area 202. In This Way, The User May Modify The Settings Of All Of The Configuration Parameters Of The Camera According To The User's Preference, Such That Upon The Next Power-on Of The Device, The User's Desired Settings Would Automatically Be Loaded Into The Working Memory Of The Processor.

[0026]alternatively, At A Power-down, The Device May Automatically Save The Settings As A New Set Of Operational Parameters. Further, If The User Has Changed Any Settings, The Device May Prompt The User And Ask Whether The User Wants To Save The Changes As A New Set. In Yet Another Alternative, The User May Optionally Load And Store Settings From Another Electronic Device (such As A Personal Computer (PC), A Personal Digital Assistant (PDA), Etc.). Moreover, Externally Generated Settings May Be Imported Into The Device Through A Removable Memory Medium, Such As From A Flash Card, Smart Cart, Etc.

[0027]as Shown In Fig. 3B, According To The Invention The User Also May Select A Personalization Mode Setting Of The Camera, In Which The User Sets Specific Values Of The Operational Parameters Of The Camera For A Specific User Or Photographic Situation Identifier. At Step 301 B The Device Is Powered-on, As Previously Discussed.

[0028]at Step 302 B The Power-on Settings Are Retrieved From The Storage Medium And Loaded Into The Processor's Working Memory. The Loading Preferably Includes Loading A Particular Set Of User-selected Operational Parameters, Assuming That The User Has Selected From Among Various Stored Sets Of Operational Parameters (in The Configuration Mode Storage Areas 203-206). However, If The User Has Not Specified The Operational Parameters To Be Loaded, The Method May Optionally Perform One Of Several Choices. The Device May Choose A First Set Of Operational Parameters (i.e., The First Occurring Set Of Parameters In The Configuration Mode Storage Area 203). Alternatively, The Device May Load A Most Often Used Set Of Operational Parameters, May Load From Factory Default Settings, Or May Choose To Load A Set Of User-defined Operational Parameters If Only One Such Set Exists (and Load Default Values Otherwise). These Various Optional Selection Steps May Be Performed After The Expiration Of A Predetermined Power-up Initialization Time Period. Therefore, The Device May Take Some Defined Action In A Situation Where The Time Period Has Expired Without A User Selection Occurring.

[0029]at Step 303 B, The User Selects A Personalization Mode Setting Of The Camera, Whereupon A User Identifier Menu Will Be Displayed To The User.

314

Figure 3C:
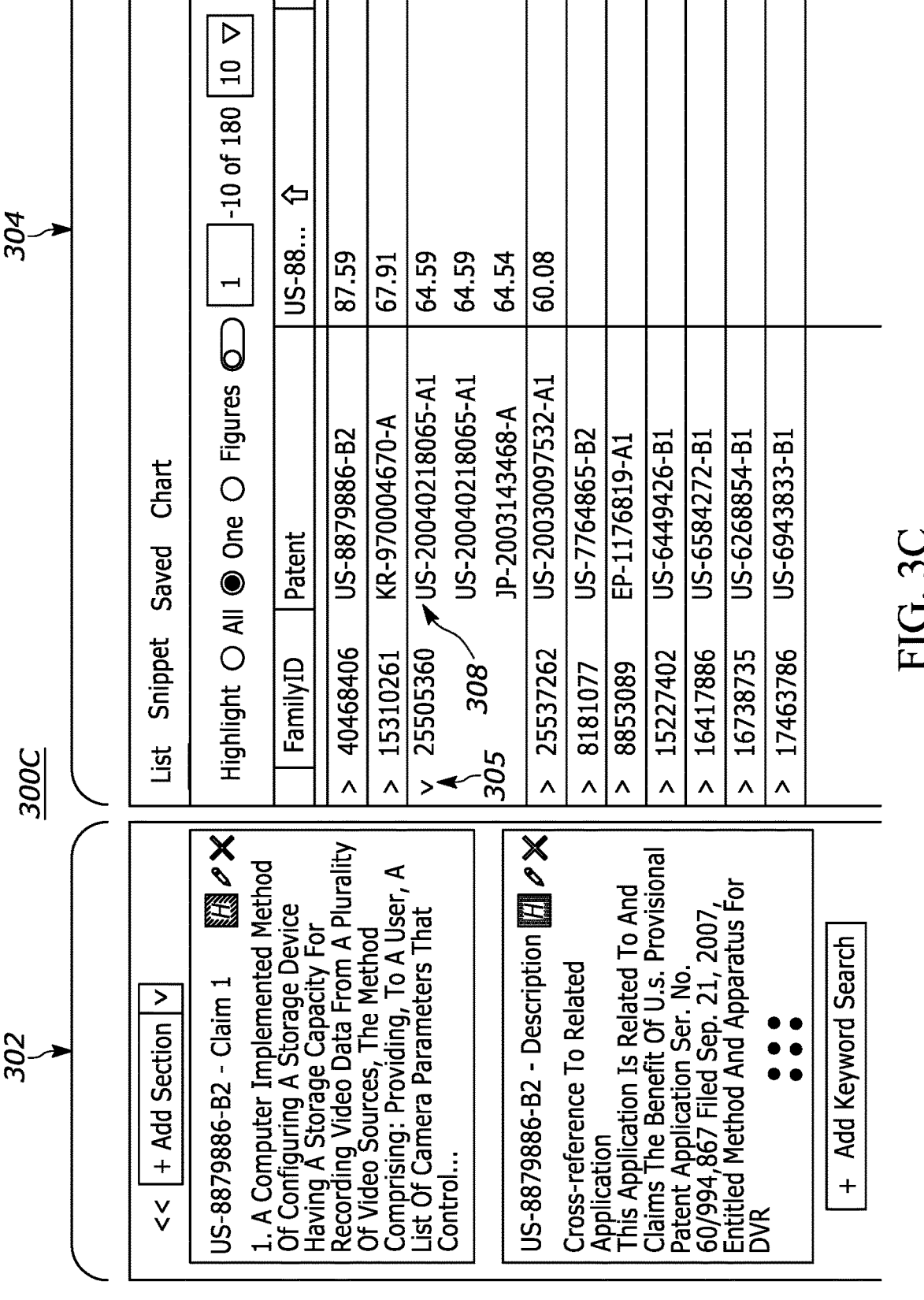
Figure 3D:
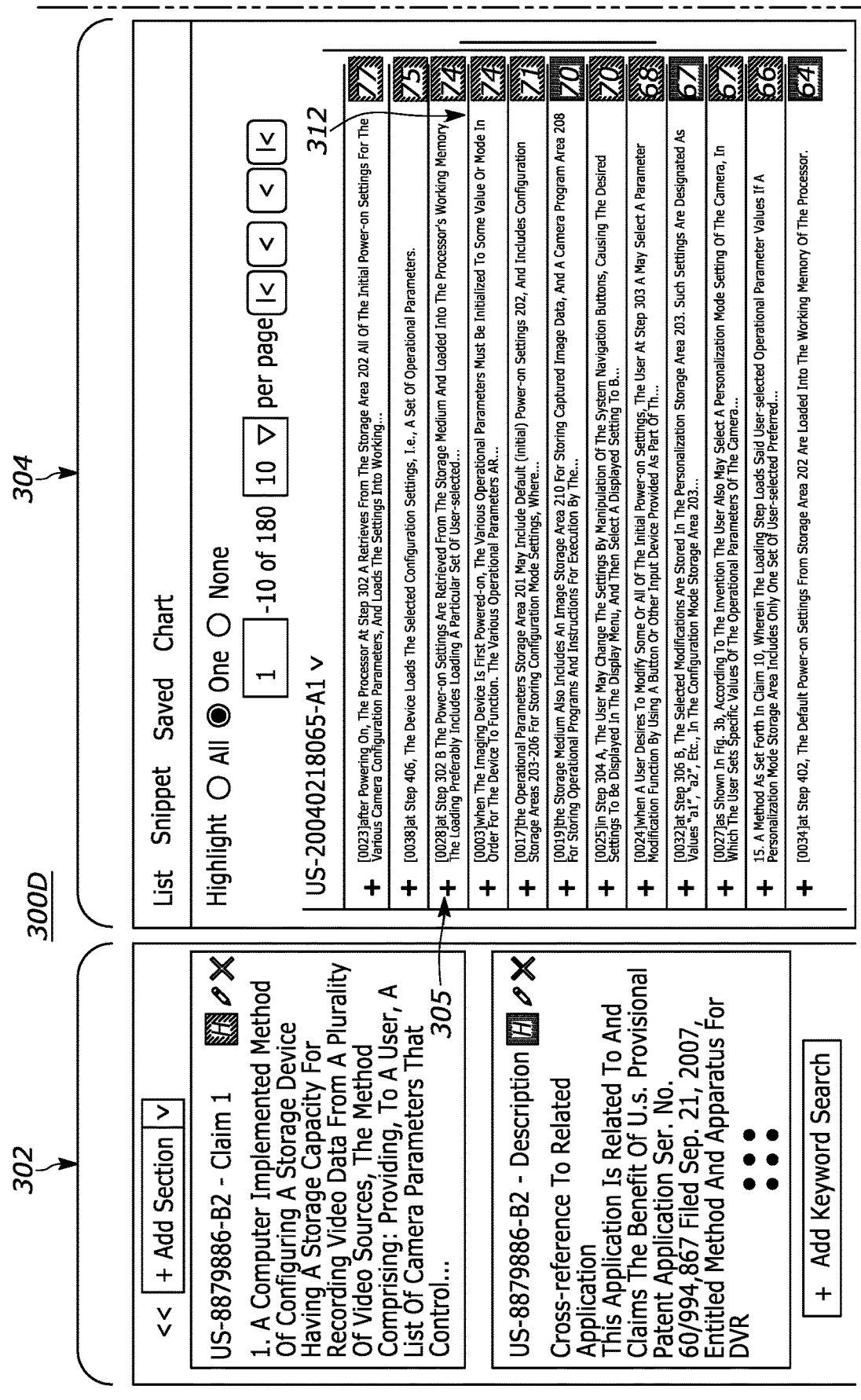

FIG. 3D (Continued)

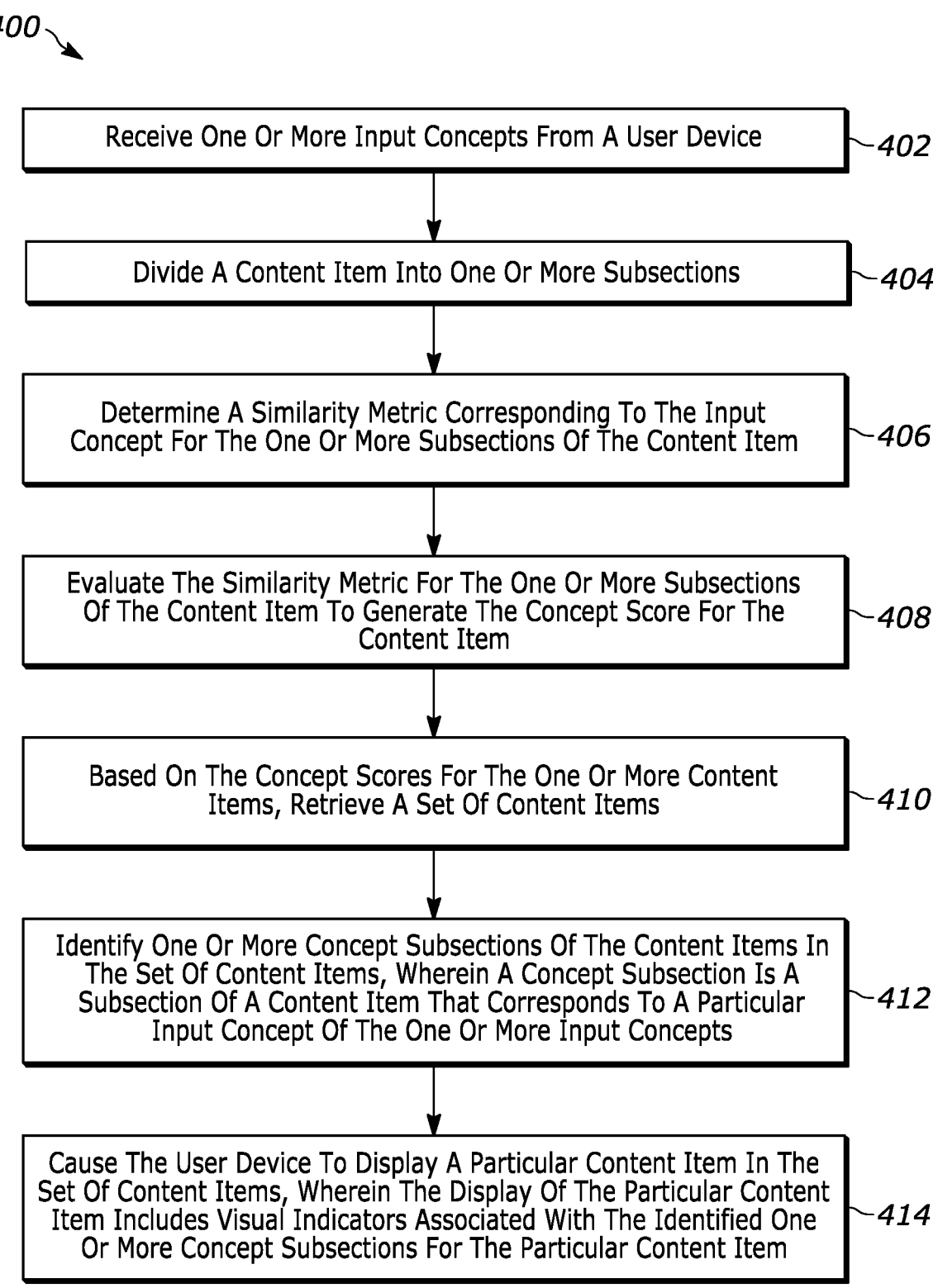

400

Receive One Or More Input Concepts From A User Device ~402

Divide A Content Item Into One Or More Subsections ~404

Determine A Similarity Metric Corresponding To The Input Concept For The One Or More Subsections Of The Content Item ~406

Evaluate The Similarity Metric For The One Or More Subsections Of The Content Item To Generate The Concept Score For The Content Item ~408

Based On The Concept Scores For The One Or More Content Items, Retrieve A Set Of Content Items ~410

Identify One Or More Concept Subsections Of The Content Items In The Set Of Content Items, Wherein A Concept Subsection Is A Subsection Of A Content Item That Corresponds To A Particular Input Concept Of The One Or More Input Concepts ~412

Cause The User Device To Display A Particular Content Item In The Set Of Content Items, Wherein The Display Of The Particular Content Item Includes Visual Indicators Associated With The Identified One Or More Concept Subsections For The Particular Content Item ~414

FIG. 4

SYSTEMS AND METHODS FOR CONCEPTUAL HIGHLIGHTING OF DOCUMENT SEARCH RESULTS

FIELD OF THE DISCLOSURE

The present disclosure relates generally to document viewing platforms, and more particularly to techniques that search, highlight, and/or display documents based on conceptual searching techniques.

BACKGROUND

When performing a document search reviewers are commonly provided with a voluminous corpus of documents that tangentially relate to the search being performed. Additionally, a reviewer performing the search may need to analyze the documents in depth to determine where and to what extent the document is relevant. This may involve the need to review hundreds of documents. While a general conceptual search may often reduce the number of documents needed to review, the search results generally fail to provide insight regarding the location of important and/or relevant features in documents and/or portions of documents. Thus, often, there is still a need to manually review large quantities of documents to validate the search results.

As some examples, a researcher may be searching a corpus of medical research journal articles, a patent searcher may be searching multiple patent publication databases, or a litigator may be searching through multiple documents provided through discovery. Given the complex nature of these or similar searches, current techniques for performing conceptual searches may lack precision in providing results or may require additional searching to properly narrow the results. Accordingly, manual review of these search results is typically performed, even when machine learning techniques are applied to improve the search results. The review of the document then requires a user to locate the important portions of the document rather than immediately performing a more in-depth analysis, leading to additional wasted time in performing unimportant tasks.

Accordingly, there is a need for systems and methods for conceptual highlighting of document search results.

BRIEF SUMMARY

In one embodiment, a computer-implemented method for performing a conceptual search is provided. The method includes: (1) receiving, by one or more processors, one or more input concepts from a user device; (2) calculating, by the one or more processors, concept scores for the one or more input concepts for one or more content items, wherein calculating a concept score for an input concept for a content item includes: (a) dividing the content item into one or more subsections, (b) determining a similarity metric corresponding to the input concept for the one or more subsections of the content item, and (c) evaluating the similarity metric for the one or more subsections of the content item to generate the concept score for the content item; (3) based on the concept scores for the one or more content items, retrieving, by the one or more processors, a set of content items; (4) identifying, by the one or more processors, one or more concept subsections of the content items in the set of content items, wherein a concept subsection is a subsection of a content item that corresponds to a particular input concept of the one or more input concepts; and (5) causing, by the one or more processors, the user device to display a particular content item in the set of content items, wherein the display of the particular content item includes visual indicators associated with the identified one or more concept subsections for the particular content item.

In another embodiment, a system for performing a conceptual search is provided. The system includes: (I) one or more processors; and (II) a non-transitory memory storing instructions that, when executed by the one or more processors, cause the system to: (1) receive one or more input concepts from a user device; (2) calculate concept scores for the one or more input concepts for one or more content items, wherein calculating a concept score for an input concept for a content item includes: (a) dividing the content item into one or more subsections, (b) determining a similarity metric corresponding to the input concept for the one or more subsections of the content item, and (c) evaluating the similarity metric for the one or more subsections of the content item to generate the concept score for the content item; (3) based on the concept scores for the one or more content items, retrieve a set of content items; (4) identify one or more concept subsections of the content items in the set of content items, wherein a concept subsection is a subsection of a content item that corresponds to a particular input concept of the one or more input concepts; and (5) cause the user device to display a particular content item in the set of content items, wherein the display of the particular content item includes visual indicators associated with the identified one or more concept subsections for the particular content item.

BRIEF DESCRIPTION OF THE DRAWINGS

FIG. 1 illustrates an example environment that may be used to implement the disclosed conceptual searching techniques, according to an embodiment;

FIG. 2 illustrates an example process for evaluating content items as it relates to one or more input concepts, according to an embodiment;

FIG. 3A illustrates a scenario using an example user interface associated with selecting a content item and content section as an input concept, according to an embodiment;

FIG. 3B illustrates an additional scenario using an example user interface associated with displaying a listing of input concepts and a list of conceptual search results based on such, according to an embodiment;

FIG. 3C illustrates another additional scenario using an example user interface associated with viewing a content item as well as an indication of which content item is presently being displayed in the conceptual search results, according to an embodiment;

FIG. 3D illustrates another additional scenario using an example user interface associated with viewing a content item, a listing of subsections related to the input concepts in the content item, and a highlighting of one such subsection, according to an embodiment; and FIG. 4 illustrates an example flow diagram of a method for performing a conceptual search of content items and presenting relevant information to a user based on the results of the conceptual search, according to an embodiment.

DETAILED DESCRIPTION

I. Overview

The present techniques relate to the usage of conceptual searches performed on input concepts from a user device to evaluate, rank, and display results of the searches. In particular, the displayed search results may be configured to highlight the particular subsection(s) related to the input concepts. In some embodiments, the input searches may be based upon conceptual search techniques that implement different vectorization algorithms. As such, a user can more easily find the particular portions of content items that are relevant to a conceptual search and evaluate which conceptual searching technique is best suited to any current needs for the user.

As it is generally used herein, the term "input concept" refers to an input by a user and/or a user device representing the concept for which the system is to perform a search. As described in more detail further herein, the input concept may be a word, a phrase, a sentence, a paragraph, or any other text input from a user, an uploaded content item, a content section of a content item, etc.

As it is generally used herein, the term "content item" refers to an object that conveys information to a user of a user device. A content item may include documents such as text documents (e.g., patents and patent publications, research papers, emails) or other type of documents that include semantic data upon which conceptual search techniques may be applied. For example, a content item may be a Microsoft Word file, a text file, an email, a pdf, a presentation, a spreadsheet, an image, a messaging file format, and/or other types of files. The content item may be segmented into subsections intended to convey different types of information to the user. Accordingly, as it is generally used herein, the term "content section" refers to a predefined section of a content item, such as the abstract, claims, or description of a patent document, the abstract of a research paper, the body of an email. Additionally, the content sections may further be divided into subsections (e.g., sentences, paragraphs, author-defined sections, etc.). In some embodiments, a content section is divided into subsections using a window having a size that is predetermined or input by a user.

As will be explained below, the conceptual search techniques described herein may be applied to identify particular subsections that are associated with an input concept. Accordingly, as it is generally used herein, the term "concept subsection" refers to a subsection of a content item that is correlated to an input concept. Said another way, the concept subsections of a content item generally correspond to the particular subsections that resulted in the content item being responsive to a search based on an input concept.

Object models generally correspond to one or more content items. One or more object models may correspond to one or more content items according to any suitable relationship (e.g., in a one-to-one relationship, in a many-to-one relationship, in a one-to-many relationship, in a many-to-many relationship, etc.). In addition to the content item itself, the object model may include one or more sets of metadata associated with the content item. For example, the metadata may include an indication of an author, a publishing date, a relevancy determined by an algorithm, a coding decision, and/or other attributes of the content item. As another example, for content items that include text, the metadata may include a raw text file that excludes any formatting characters. For some content items, the raw text file is generated by applying optical character recognition (OCR) techniques.

As yet another example, the metadata may include objects that affect how the content item is displayed. To this end, the metadata may include a highlighting object indicative of portions of the content item that are highlighted and/or a comments object indicative of portions of the content item that include comments and/or annotations. The highlighting and/or comments objects may be determined based upon rules and/or data sets associated with the workspace that includes the object model. For instance, a highlighting data set associated with the workspace may indicate that each instance of a particular term or concept is to be highlighted in each content item in the workspace, as described in more detail below.

By utilizing the techniques and methods herein, a system as described provides an improvement over conventional systems at least by performing conceptual searches of content items based on input concepts. In particular, the system uses embedding machine learning model(s) to generate embedded vectors representative of content items and/or subsections of content items and compares the generated embedded vectors to similarity generated vectors for received input concepts for similarity. As such, a user can perform multiple conceptual searches and compare results across multiple concepts to better perform searches of content items in a database and/or compiled workspace. Moreover, by better refining the searches and using multiple conceptual searches, an overall corpus of content items to be searched can be further reduced, improving the overall processing time to perform an accurate search. Further, by automatically displaying potentially relevant content items and further displaying visual indicators of where the portions relevant to a search are located within the content items, the system reduces the required time spent searching both by the system and the user, as well as improves the accuracy of the final results of the search. Other improvements are further contemplated and discussed herein.

II. Example Computing Environment

FIG. 1 depicts an example computing environment 100 that may be used to implement the disclosed conceptual searching techniques. As illustrated, the environment 100 includes a server 102 communicatively coupled to a user device 104, also referred to herein as a client device, via network 105. The network 105 may be a single communication network, or may include multiple communication networks of one or more types (e.g., one or more wired and/or wireless local area networks (LANs), and/or one or more wired and/or wireless wide area networks (WANs) such as the Internet). The server 102 may be a web server, a back-end server, or any combination thereof. Additionally, while FIG. 1 shows only a single user device 104, it is understood that multiple different user devices (of different entities and/or users), each similar to the user device 104, may be in remote communication with the server 102 via the network 105 and/or alternative networks.

As illustrated, the server 102 also includes a network interface controller (NIC) 124. The NIC 124 may include any suitable network interface controller(s), such as wired/wireless controllers (e.g., Ethernet controllers), and may facilitate bidirectional/multiplexed networking over the network 105 between the server 102 and other components of the environment 100 (e.g., the user device 104, hardware units that form the server 102 in a distributed computing environment, etc.).

The server 102 includes a processor 120. While referred to in the singular, the processor 120 may include any suitable number of processors of one or more types (e.g., one or more microprocessors, one or more CPUs, one or more GPUs, etc.). Generally, processor 120 is configured to execute software instructions stored in one or more memories 130

(e.g., stored in a persistent memory such as a hard drive or solid state memory) of the server 102. It should be appreciated that certain instructions may be more efficiently executed by different types of processors (e.g., generating a rendering of a content item may be more efficiently performed by a GPU, whereas as the establishment of a workspace may be more efficiently executed by a CPU). Accordingly, the server 102 may be configured to execute different instructions using the different processor types. Additionally, while FIG. 1 depicts a single processor 120 and a single memory 130, the processor 120 and the memory 130 may include any number of processors or memories, including processors and memories located in different physical units and connected via a distributed computing platform.

The server 102 may store a corpus content items in an object database 110 as described below. For example, the content items may be patent publications, research papers, communication documents, etc. The object database 110 may be implemented using a relational database management system (RDBMS) such as MySQL, PostgreSQL, Oracle, etc. or a non-relational database structure, such as a NoSQL structure.

Generally, the server 102 hosts services relating to performing searches of content items, which may be accessed/utilized by the user device 104. For example, one service may relate to conducting searches of content item database(s). The software instructions stored in the memory 130, when executed by the processor 120, implement one or modules 140 that support the services. For example, as part of storing a content item in the object database 110, the server 102 may execute an object generation module 144 to generate an object model that describes the content item. An object model may be and/or include an object representing the "raw data" contents of a content item. To facilitate the generation of the object model, the object generation module 144 may execute functions associated with a metadata processing module 143 and/or a content item processing module 146. The metadata processing module 143 may analyze the content item then populate a set of metadata associated with content item attributes and generate a raw text file associated with any text in the content item, as described in more detail below and with regard to FIG. 2.

An additional module of the modules 140 is a workspace module 148 configured to establish a workspace for the review of content items. For example, the workspace module 148 may implement one or more content item collection modules for importing a plurality of content items from the object database 110 into a workspace database 118, where a workspace may access relevant content items. As another example, the workspace module 148 may receive one or more search and/or filter queries to restrict the corpus of content items down to a particularly relevant segment of the corpus. The workspace module 148 may receive a content-based or concept-based query and a time-based query to reduce a plurality of patent documents in the object database 110 from, for example, a corpus of over 10 million content items to a set of about the 300,000 most relevant content items. By restricting and/or reducing the number of content items in the workspace, there are fewer content items to compare using the similarity techniques disclosed herein. As a result, if a user wants to execute an additional conceptual search based on a different machine learning model, the additional search of the corpus of content items can be executed more quickly.

The workspace module 148 may further maintain and update one or more embedded machine learning models based upon input received from user devices 104 as to the similarity of content items to an input concept. In some implementations, the workspace module 148 preprocesses one or more embedded machine learning modules for a workspace before performing a search. For example, the workspace module 148 may generate one or more embedding vectors for content items in the workspace using one or more embedded machine learning model using techniques such as a support vector machine (SVM) model, a bidirectional encoder representations from transformers (BERT) model, a latent semantic index (LSI) model, a doc2vec model, a global vector (GloVe) model, another embedding model, or a combination of models. As a result, the content items may be associated with embedding vectors that represent the outputs of multiple different embedding models. Because different embedding models emphasize different conceptual aspects of documents, a first conceptual search may return more relevant results using a first embedding model and a second conceptual search may return more relevant results using a second embedding model. Accordingly, by generating the multiple different embedding vectors for a given content item, the system 104 is able to provide more flexible searching capabilities without the need to re-index the corpus of content items.

In some embodiments, the workspace module 148 inputs the entire content item into the embedding model to generate the embedding vectors. Additionally or alternatively, the workspace module 148 inputs the content subsections of the content item into the embedding model to generate the embedding vectors. In still further examples, the workspace module 148 inputs the subsections of the content item into the embedding model to generate the embedding vectors. In embodiments that include multiple embedding vectors for a given content item, the workspace module 148 may be configured to combine the component embedding vectors to produce a single vector for the content item (e.g., by performing a weighted average of the component embedding vectors). It should be appreciated that the workspace module 148 may later update the embedding as described below with regard to FIGS. 2-4.

The server 102 may be configured to execute a conceptual search module 149 to perform a search of content items stored in the object database 110 in conjunction with and/or using the outputs of the workspace module 148. In some implementations, the conceptual search module 149 receives one or more input concepts from the user device 104, such as from a concept input module 199 executing thereon. In response, the conceptual search module 149 may apply one or more embedding machine learning models to generate respective embedding vectors for the input concepts. In some embodiments, the conceptual search module 149 also receives an indication of an embedding model corresponding to the input concepts. In these embodiments, the conceptual search module 149 may be configured to apply the indicated embedding model to the corresponding input concept to generate the embedding vectors for the input concepts. In other embodiments, the conceptual search module 149 may apply a default embedding machine learning model to the input concepts. In some embodiments, the default embedding machine learning model for the workspace is configurable via the workspace module 148. After generating embedding vectors corresponding the input concepts, the conceptual search module 149 may invoke a similarity module 147 to determine conceptual similarity between the input concepts and the content items in the workspace.

The server 102 may be configured to execute the similarity module 147 to assign a similarity metric to content items within the workspace and/or subsections thereof. For example, the similarity module 147 may use a similarity model to determine a similarity by comparing embedded vectors for various content items in the workspace to embedding vectors of the input concepts input into the conceptual search module 149. For example, the similarity module 147 may be configured to calculate a Euclidean distance and/or cosine similarity between embedding vectors for the content items in the workspace and the embedding vectors representative of the input concept(s). More particularly, the similarity module 147 may be configured to generate a similarity metric for each content item in the workspace and each input concept.

In embodiments where the similarity module 147 executes on subsections of the content items, the server 102 causes, via the similarity module 147 and/or the conceptual search module 149, the user device 104 to display highlighting for where each input concept occurs in the content items by highlighting relevant subsections of the content item(s) in accordance with the highlighting techniques described herein. For example, the server 102 may generate a highlighting model to associate with the corresponding object model of the content item. The highlighting model may include subsections of text that exhibit a sufficiently high similarity to the input concept(s), as explored in more detail below.

In some embodiments, the server 102 configures the highlighting model such that the portions of the content item related to different input concepts are highlighted in different colors. For example, in response to detecting user input of a first input concept, concept A, a second input concept, concept B, and a third input concept, concept C, the server 102 may configure the highlighting model for the portions relevant to concept A to utilize yellow, portions relevant to concept B to utilize blue, and portions relevant to concept C to utilize orange. In some scenarios, the same portion is relevant to multiple concepts. In these scenarios, the server 102 may configure the highlighting model for the portion in question to utilize multiple colors (e.g., blue and yellow stripes for both concepts A and B), a mix of the two colors (e.g., green for both concepts A and B), a separate color designated for mixes (e.g., yellow for A, blue for B, and red for both), the dominant color based on similarity metric (e.g., A has a higher score than B so yellow), a user-selected color (user is looking at input concept B so highlights blue), or any other similar technique as described herein. In further embodiments, the server 102 may vary a highlighting intensity of the highlighting model depending on the corresponding concept score or similarity metric. For example, if a subsection of a content item has a low similarity metric, the server 102 may assign the highlighting model a low intensity value. If the subsection has a higher similarity metric, the server 102 may assign the highlighting model a high intensity value. A module 140, such as the similarity module 147, may also ensure any highlighting or commenting data sets of the workspace are associated with the content item.

In the illustrated example, the server 102 also includes one or more input/output (I/O) devices 122. For example, the server 102 may include a mouse or keyboard to enable a user to configure settings of the server 102, update and/or install the software modules 140, and/or perform various other server maintenance tasks. As another example, the server 102 may include a display screen via which a user is able to view one or more graphical user interfaces. It should be appreciated that in some embodiments, such as when the server 102 is a virtualized computing device in a cloud computing environment, the server 102 may not include an I/O device 122.

A user may interact with a user device 104 to perform a conceptual search via the server 102. The user device 104 may be a laptop computer, a desktop computer, a tablet, a smartphone, or any other suitable type of computing device. In the embodiment of FIG. 1, the user device 104 includes a processor 170. The processor 170 may include one or more microprocessors (e.g., one or more central processing units (CPUs) and/or one or more graphics processing units (GPUs)), for example. Additionally, the user device 104 includes a memory 180. The memory 180 may include a program memory that stores software instructions that form one or more modules 190 and a data memory configured to facilitate conceptual searching of input concepts. Generally, the processor 170 is configured to execute software instructions stored in the program memory of the memory 180. The program storage may include one or more persistent memories (e.g., a hard drive and/or solid state memory) and a data memory, such as temporary memories, including buffers, for storing the document models of contents items to be displayed at the user device 104. In some embodiments, the data memory is a dedicated segment of a physical memory unit at the user device 104. Additionally or alternatively, the data memory may be a component of a graphics card or chipset included in the user device 104.

As illustrated, the user device 104 also includes a network interface controller (NIC) 174. The NIC 174 may include any suitable network interface controller(s), such as wired/wireless controllers (e.g., Ethernet controllers), and may facilitate bidirectional/multiplexed networking over the network 105 between the user device 104 and other components of the environment 100 (e.g., another user device 104, the server 102, etc.). The user device also includes one or more I/O devices 172. For example, the user device 104 may include a display screen via which the graphical user interfaces described herein are displayed. As another example, the user device 104 may include a mouse, keyboard, and/or a touch screen to enable a user to interact with the various graphical user interfaces described herein.

As illustrated, the user device 104 includes a cache 160. Workspaces often include too many content items to practically store the corresponding object models at the user device 104. Accordingly, the cache 160 may be configured to store a subset of the object models corresponding to content items that the user of the user device 104 is likely to review (e.g., the content items having a threshold similarity to an input concept). To this end, the user device 104 may execute a workspace module 192 to load the cache 160 with object models corresponding to the content items that the user is likely to review.

To improve the speed at which the user device 104 is able to display the object models in the cache 160, the user device 104 may execute an object processing module 193 to begin processing the object models into corresponding document models before a user begins reviewing the search results. Techniques for predictive processing of object models are described in U.S. patent application Ser. No. 17/711,519, the entirety of which is incorporated herein by reference. The object processing module 193 may then store the document models in the data memory of the memory 180 for quicker display of the search results.

The user device 104 may execute a viewer module 194 to display a user interface associated with the workspace, as described in more detail below and with regard to FIGS. 3A-3D. More particularly, the viewer module 194 may be configured to interact with an interface identification module 142 of the server 102 to obtain a user interface framework and/or populate data indicated by a local or remote user interface framework. For example, the user interface may include a selection interface that enables the user to select a particular content item from a plurality of content items. To this end, the selection interface may include a ranked list of content items or an ordered list of content items based on similarity to one or more input concepts. The user interface may also include one or more viewports via which renderings of content items are displayed. In particular, the viewports may include an object focus setting that causes the assigned content item to be displayed via the viewports. For example, if the user selects a particular content item via the selection interface, the viewer module 194 may then set the object focus of a viewport to the document model of the corresponding content item. If a corresponding document model is stored in the data memory, the viewer module 194 retrieves the document model stored in the memory location associated with the content item and displays the document model via the viewport. In some embodiments, the viewport is a dedicated portion of the user interface (e.g., a content item preview panel). In other embodiments, the viewport is transient (e.g., a thumbnail preview displayed when a cursors hovers on a particular object in the selection interface for a threshold amount of time). In still other embodiments, the user interface includes multiple viewports having respective object focus settings.

The user device 104 may further execute a highlighting module 198 to process and display the highlighting. In some implementations, the highlighting module 198 works in conjunction with the viewer module 194 to display highlighting. The highlighting module 198 may be configured to analyze any highlighting or comment sets, the raw text file, and/or the content item file itself to generate image files of the content item that comply with the highlighting and/or comment data sets. In some embodiments, the highlighting module 198 creates a layer that includes the highlighting and/or comments and burns the created layer on top of an image of the content item. In other embodiments, the highlighting and/or comment layers are maintained as a separate image file or data structure for processing at a user device 104 when the content item is displayed thereat. In some such implementations, the user device 104 displays each layer as a whole in response to a user request to display the highlighting as described herein. In other implementations, the user device 104 displays portions of each layer based on the user request (e.g., a click event on a single subsection displays only the highlighted portions associated with the subsection).

It should be appreciated that displaying highlighting and/or comments may be more processor intensive than displaying a rendering of a content item that does not include highlighting and/or comments. To this end, in embodiments where the highlighting data is maintained as a highlighting set (e.g., when the similarity module 147 generates a highlighting set corresponding to the particular subsections of a content item that are sufficiently similar to an input concept), the viewer module 194 may need to determine the particular location in the viewport where particular terms are displayed to ensure that the terms are highlighted when displayed. Accordingly, for these objects, the viewer module 194 may invoke functions of a highlighting module 198 to ensure that the highlighting is only applied to the content item when the corresponding portion of the content item is viewable with the viewport. As a result, the user device 104 does not spend processing power highlighting the content item when the highlighted text is not visible.

While FIG. 1 depicts the highlighting module 198 as part of user device 104, in other implementations the highlighting module 198 is part of the server 102 and/or the server 102 performs some of the functionality of the highlighting module 198. In still other implementations, the highlighting module 198 handles displaying the highlighting while a separate module of the server 102, such as the conceptual search module 149 or similarity module 147 generates the highlighting model and highlighting data.

III. Using a Document Model to Evaluate Content Items

FIG. 2 depicts an example method 200 for performing a conceptual search of one or more input concepts received at a server 102. As illustrated, the method 200 begins at block 201 when the server 102 stores content item into a database such as object database 110 of FIG. 1. Table 210 depicts an example database structure for the object database 110. For example, the object database 110 may include columns corresponding to a paragraph identifier column 212, a patent identifier column 214, a class code column 216, an inventor column 218, a priority date column 220, or any other columns 222 of similar metadata. In some implementations, the other columns 222 of similar metadata includes columns recording metadata such as language(s) associated with the content item. In such implementations, the server 102 may determine the language(s) associated with the content item through optical character recognition (OCR), based on a user indication of such, based on a workspace language of the overall workspace, or any other similarly suitable technique. It should be appreciated that while the table 210 represents a flat table structure, in some embodiments, the table is implemented as a plurality of relationally-linked data tables. The server 102 may populate the columns for the content item using one or more of the modules 140, such as the metadata module 143 or the processing module 146. As described above, the server 102 may divide the content item into smaller subsections. In these embodiments, the object database 110 may include a separate row for each subsection and hierarchically link the subsections of the content item. For example, the paragraph identifier 212 may include a subsection identifier separated from a content item identifier by a delimiter.

In some embodiments, as a new content item is added to the object database 110, the server 102 is configured to execute one or more embedding machine learning models to generate the embedding vectors that correspond to the columns 230. As a result, as the new content items are added to the object database 110, the content items are associated with the conceptual representations in a consistent manner as other content items maintained at the object database 110. In some embodiments, the server 102 may be adapted to support additional embedding machine learning models. Accordingly, the server 102 may add an additional new column to the table 210 and input the content items (and/or subsections thereof) into the new embedding machine learning model to generate the corresponding embedded vectors.

The server 102 may use the columns of the data table 210 as types of filters that can be applied to restrict the number of content items included into a workspace. Accordingly, when the user performs a search within the workspace, there are fewer similarity calculations to perform via the similarity model to produce search results, as described in more detail below with regard to block 206. For example, if class code filters are applied to a database of patent content items, the processing time for performing the conceptual search on the content items in the workspace is reduced with minimal impact on the ability to provide relevant results for an input concept.

The server 102 may further import content items from the object database 110 into the workspace in accordance with any filters applied to restrict the number content items in the workspace. In some implementations, the server 102 imports content items from the object database 110 into a workspace database 118. In such implementations, the workspace module 148 and/or other modules 140 may access the workspace database 118 to perform searches and similarity comparisons of the content items imported into the workspace database 118.

At block 202, the server 102 receives input concepts from the user device 104. For example, the user may designate an input concept by indicating a particular content item maintained at the object database 110. In some embodiments, the user may instead indicate a particular content section of the particular content item. In still further embodiments, a user may upload a new content item as an input concept. In yet still further embodiments, the input concept is user-provided text.

In some embodiments, the server 102 receives a single input concept from the user device 104. In further implementations, the server 102 receives multiple input concepts from the user device 104. For example, the server 102 may receive a first input concept from the user device 104 before receiving additional input concept.

In some embodiments, the server 102 may also receive one or more input keywords and/or Boolean search operators to apply to the content items in the workspace. For example, the server 102 may use the keywords and/or Boolean search operators to filter content items in the workspace. As another example, an output of the keyword and/or Boolean search operator are presented as an additional column when providing search results to the user.

In some embodiments, the server 102 determines an embedding model type to use based on a user input of an input concept. In further implementations, the server 102 may automatically determine a default embedding model type to use based on one or more criteria of the input concept(s), the content items, the type of analysis, etc. Similarly, the server 102 may utilize any other method for selecting an embedding model type as described elsewhere herein. In some scenarios, the server 102 may use a first embedding model type for a first input concept and a second embedding model type for a second input concept.

At block 204, the server 102 may tokenize the input concept and embeds the input concept into embedded vectors using the embedding models identified at block 202. It should be appreciated that if the input concept is a content item maintained at the database 110, the input concept may have been previously tokenized and converted into a embedding vector as part of the content item ingestion process. Accordingly, if there is already an embedding vector in the database 110 that corresponds to the input concept, the server 102 may obtain this embedding vector without tokenizing the input concept again.

If the input concept is a new content item or a string of user-provided text, the server 102 may tokenize the input concepts by transforming the input concept into tokens using natural language processing, string tokenization, and/or other such techniques to facilitate converting the input concept into a series of tokens representative of characters, words, sentences, etc. of the input concept. After tokenizing the input concepts, the server 102 may then input the sets of tokens into the embedding machine learning model to generate the embedding vector(s) for the input concepts as described above with regard to FIG. 1.

At block 206, the server 102 inputs embedding vectors for the content items in the workspace and the input concepts into the similarity model to determine similarity, for example, using the similarity module 147 of FIG. 1. More particularly, the server 102 inputs the particular embedding vector that corresponds to the embedding model type for the input concept into the similarity model. If the user specified a particular content section at block 202, the server 102 instead inputs the embedding vector for that content section rather than the embedding vector for the content item as a whole. In some embodiments, the server 102 may additionally or alternatively obtain the subsection embedding vectors for the content items (and/or indicated content subsections thereof) and input the subsection embedding vectors into the similarity model. As a result, the server 102 may obtain a similarity value for the content item as a whole, for a particular content subsection, and/or each subsection thereof.

Further, the server 102 determines a Euclidean distance and/or cosine similarity between a vector representative of the input concept and a vector representative of the content item and/or subsection. The server 102 may generate a similarity metric based on the Euclidean distance, cosine similarity, or some other similarity measurement comparing the embedding vectors 230. In some embodiments, the similarity metric is normalized to a scale of 0-1, 1-10, 1-100, etc., where a low similarity value represents greatly differing concepts and a high similarity value represents highly similar concepts between the input concept and the content item and/or subsection thereof.

At block 208, the server 102 evaluates the outputs of the similarity model generated at block 206 and generates results and scores for each input concept and content item comparison. In some implementations, the server 102 performs the generation at block 208 using the stored embedding vectors 230 for content items and comparing the stored embedding vectors 230 to the input concept(s) received at block 202. In further implementations, the server 102 performs the generation at block 208 using stored embedding vectors 230 for both content items and input concepts. For example, the server 102 may generate the concept score for a content item by combining the similarity values for the component subsections. For example, the server 102 may determine that the concept score for a content item is a maximum subsection similarity value, a mean subsection similarity value, median subsection similarity value, etc. for each input concept.

Alternatively, the server 102 may generate the concept score by weighting various similarity metrics based on historical relevance of particular content subsections, prediction of potential relevance of particular content subsections, indications by a user of potential relevance, etc. For example, the server 102 may receive an indication from a user of particular weighting to assign to the particular content sections. The server 102 may then combine the similarity values for the corresponding content subsections by applying the user-provided weights.

IV. Example Implementation of User Device Display of Concept Searching and Highlighting Results FIGS. 3A-3D generally relate to user interfaces that provide renderings of content items and/or visual indicators, such as highlighting, that indicate the results of a conceptual search.

FIG. 3A illustrates a scenario using an example user interface 300A associated with selecting a content item and content section of the content item as an input concept. A user device 104 of FIG. 1, may display the user interface 300A. In particular, the example user interface 300A includes a concept window 320 in which a user can provide an input concept for performing a conceptual search of content items. It will be understood that, although the concept window 320 is depicted as an overlay in FIG. 3A, the concept window 320 may also be a sidebar, part of a panel in the main portion of the user interface 300A, or otherwise a part of the user interface 300A.

The example user interface 300A may include one or more data entry elements as part of the concept window 320. For example, a first data entry element 322 may be a text field that enables a user to input a content item identifier. As another example, a second data entry element 324 may be a drop down box that enables user to select a particular content section on which to perform the conceptual search (e.g., abstract, description, claims, abstract/description/claims, etc.). As a third example, a third data entry element 326 may be a text field via which a user provides a name for the input concept so the user can distinguish between different input concepts.

As yet another example, a fourth data entry element 328 may be a text box via which the user provides concept text that is used as a reference when performing the conceptual search. For example, the concept text may be individual words or phrases, longer passages such as sentences or paragraphs, sections of content items, entire content items, or other such inputs. In some embodiments, the server 102 may automatically populate one or more of the fields in concept window 320 in response to a user inputting information into other fields. For example, the data entry element 328 corresponding to the concept text may automatically populate using information from the object database 110 when the user provides a content item identifier via the data entry element 322 and a content section identifier via the data entry element 324.

Additionally, the example user interface 300A includes a data entry element 329 that is a drop down box that enables the user to indicate which embedding machine learning model and/or model to use performing the conceptual search. In some embodiments, the data entry element 329 may display a default model associated with the workspace. In some embodiments, the workspace is extensible such that a user able to provide a software module configured to generate embedding vectors using a model not native to the workspace. Accordingly, upon properly configuring the workspace to reference the user-provided software module, the data entry element 329 may include an indication of the user-provided software module for selection.

In some scenarios, a user provides concept text in a different language than one or more of the content items. This may occur, for example when a user provides English-language concept text and the content items include patents filed with a patent office in a jurisdiction that do not utilize English (e.g., China, Japan, Germany, etc.). Accordingly, the server 102 may determine that the workspace and/or input concept is configured to utilize a first language and at least some of the content items are in a second language based on metadata associated therewith.

To avoid confusing the embedding machine learning models, the server 102 may convert, translate, and/or retrieve a translated version of the concept text or the content items such that both are in the same language. In a first scenario where the content text is translated, the server 102 may generate a first embedding vector based on the original concept text to utilize when generating a similarity for content items in the original language and a second embedding vector based on the translated concept text to utilize when generating a similarity for content items in the other language. In a second scenario where the content item is translated, the server 102 may generating an embedding vector for the translated content item to utilize when generating a similarity for that content item. In some embodiments, the server 102 may automatically generate (additional) English-language embedding vectors based on the translated content item when ingesting a content item that is originally authored in a different language.

FIG. 3B illustrates an example user interface 300B configured to display a list of conceptual search results based on one or more input concepts. The user device 104 (and/or the viewer module 194 thereof) may be configured to display the example user interface 300B in response to receiving the conceptual search results from the server 102.

As illustrated, the example user interface 300B includes a first panel 302 via which the user interface 300B includes a listing of input concepts. The first panel 302 may include a definition of the search to be performed for each input concept and/or the concept text of the input concept. For example, the representation of the listed input concepts may include a subset of the overall concept text provided via the data entry element 328 of FIG. 3A. The first panel 302 may further include a selection element 303 that enables the user to indicate a highlighting color corresponding to the input concept, as described herein. Further, the first panel 302 may include buttons for a user to add additional input concepts, edit and/or delete existing input concepts, add keyword searches, and any other similar function as described herein.

As illustrated, the user interface 300B includes a second panel 304 that includes a list 308 of content items that are sufficiently similar to one or more of the input concepts. In some implementations, the list 308 includes columns corresponding to identifying information for each content item, such as a family ID, patent ID, inventor name, etc. Additionally, as illustrated, the list 308 includes columns corresponding to a calculated concept score for each input concept. In some embodiments, the list 308 may only display concept scores above a pre-determined threshold (e.g., 50%, 60%, 70%, etc.). In this regard, the lack of a displayed score in the list 308 signals that the content item is not particularly similar to the corresponding input concept. In the illustrated example, content item U.S. Pat. No. 7,764,865-B2 has a concept score of 56.01 for the first input concept and a concept score of 63.99 for the second concept score. Accordingly, the list 308 only displays the concept score for the second input concept.

Additionally, the user interface 300B includes a content item viewport 306 configured to display a rendering of a selected content item. Because there is no selected content item in the illustrated user interface 300B, the viewport 306 is empty.

FIG. 3C illustrates an example user interface 300C for displaying a selected content item. For example, the user may select a content item from the list 308 by performing an interaction event (e.g., a click event, tap event, swipe event, etc.). In response, the object focus setting of viewport 306 switches to the selected content item to present a rendering thereof.

As illustrated, the user interface 300C also includes an expansion element 305 for content items included in the list 308. In response to detecting an interaction with the expansion element 305, the list 308 expands to include rows corresponding to content items related to the originally listed content item. For example, the content item may be a content item representative of a wider patent family, and interacting with the corresponding expansion element 305 expands the list 308 to include a listing of each patent belonging to the family. When the content item in the list 308 corresponds to a family of content items, the server 102 may select the particular content item to display based upon any of a family identifier, a country of origin for the search, a similarity to an input concept, a concept score, a hierarchical relationship, and/or any other prioritization preferences. For example, as illustrated, the content item for FamilyID 25505360 may be selected based upon the search occurring in the US or based on a US family member having the highest concept score.

FIG. 3D illustrates another example user interface 300D associated with viewing conceptual highlighting of a responsive subsection. The user interface 300D may be presented in response to detecting a user interaction to view the "snippet" view in the panel 304. As illustrated, the second panel 304 includes a snippet list 312 of content item subsections that are sufficiently similar to at least one of the input concepts.

As illustrated, the snippet list 312 includes a column indicating a similarity of the listed subsection. The snippet list 312 may be sorted based upon the similarity values for the subsections. In some embodiments, the similarity includes an indication of which input concept the subsection is similar (i.e., via a marking, a color, an icon, a number, etc.).

In scenarios where a user provides at least two input concepts (e.g., concept A and concept B), the server 102 may cause the user device 104 to display the similarity value for each subsection such that the similarity values for concept A are displayed first, followed by the similarity values for concept B. As another example, the server 102 may cause the user device 104 to display each concept subsection in order of the greatest similarity value to the lowest similarity value, agnostic to the relevant input concept. In further implementations, the server 102 causes the user device 104 to display the similarity values such that the rating scores are grouped by content subsection. For example, using the concepts described in the previous example, the server 102 causes the user device 104 to display the rating score for a subsection for concept A and then for the same subsection for concept B.

As illustrated, the content item viewport 306 displays highlighting 314 for each relevant subsection included in the snippet list 312. For example, the content item viewport 306 may display highlighting for the at least one content item responsive to receiving an indication of an interaction event and/or request from a user (e.g., a click event, swipe event, tap event, etc.) at a relevant subsection included in the snippet list. More particularly, a user may click on a subsection and/or a similarity metric associated with the subsection in the snippet list 312, and, in response, the content item viewport displays highlighting 314 of the appropriate subsections and/or portions of a subsection. In some implementations, the content item view automatically changes to display the highlighted portion(s) as well. As described herein, the highlighting may be adapted to indicate the input concept to which the subsection is relevant (e.g., by using different colors for different concepts). It should be appreciated that while the viewport 306 of the example user interface 300D is configured to display a raw text version of the selected content item, in other embodiments, the viewport 306 may be configured to display a PDF version of a publication of the content item. In these embodiments, the PDF version may also include in the highlighting indicative of the relevant subsections, including the coloring that identifies which input concept to which the subsection is relevant.

It should be appreciated that the user interfaces 300A, 300B, 300C, and 300D are just a few examples of user interfaces in which the disclosed techniques are implemented. Other user interfaces may include additional, fewer, or alternate user interface elements than those illustrated in FIGS. 3A-3D.

V. Exemplary Method for Performing a Conceptual Search

FIG. 4 depicts an example flow diagram 400 of a method for performing a conceptual search of content items and presenting relevant information to a user based on the results of the conceptual search. More particularly, a server and/or a user device may execute one or more modules to perform the functionality associated with the flow diagram 400. For clarity, the method of flow diagram 400 is discussed with specific reference to elements as described herein with regard to FIG. 1. However, it should be understood that, depending on the implementation, the method of flow diagram 400 may be implemented on other, similar components.

At block 402, the server 102 receives one or more input concepts from a user device 104. In some implementations, a user manually types the concept input into a search box, uploads a content item or content items, and/or designates content section(s) of a content item to serve as the input concept(s) as described above with regard to FIG. 3A. In still further implementations, the user designates the input concept(s) by highlighting, clicking, selecting, or otherwise indicating an input concept using already present objects such as content items maintained by the object database 110.

The server 102 may also receive an indication of a particular type of content item, content section, etc. to search alongside or in addition to the input concept(s). As such, a user may indicate that the server 102 is only to search for the input concept in certain content sections of content items, as discussed above with regard to FIG. 3A.

In some implementations, the server 102 receives a single input concept from the user device 104. In further implementations, the server 102 receives multiple input concepts from the user device 104. For example, the server 102 may receive a first input concept from the user device 104 before receiving an additional input concept. In some implementations, the server 102 additionally receives one or more keyword search inputs and/or Boolean search operators. The system may use the keyword search inputs and/or Boolean search operators in addition to any received input concept(s) when performing a search and/or carrying out the remainder of method 400.

After receiving the one or more input concepts from the user device 104, the server 102 calculates concept scores for the one or more input concepts for one or more content items. In some implementations, the content items are content items stored and/or retrieved from the object database 110 and/or the workspace database 118 of FIG. 1.

In some implementations, the server 102 calculates a concept score for an input concept for a content item by performing each or some of blocks 404, 406, and/or 408. In other implementations, the server 102 additionally or alternatively performs the calculation using other techniques as described herein.

At block 404, the server 102 divides the content item into subsections. In some implementations, each subsection is a different content section, page, paragraph, sentence, or other similar division. In further embodiments, the server 102 divides the content item into subsections based on a word or character count maximum for each subsection. In some such embodiments, the server 102 divides the content item such that each subsection begins immediately after the previous subsection ends. In other implementations, at least some of the subsections include at least a portion of text that is common with a previous subsection (i.e., a predetermined number of words or characters). For example, the server 102 may use a predetermined rolling word window of 500 words with a 5 word overlap. In such an example, a 1200 word content item may have three windows, one from word 1 to word 500, one from word 496 to word 995, and one from word 991 to word 1200. Depending on the embodiment, a user may determine the rolling word window, the server 102 may determine the rolling word window based on a predetermined length, or the server 102 may determine the rolling word window based on the model the server 102 uses to analyze a content item. In further embodiments, the server 102 reads metadata, such as embedded XML tags, and breaks the window based on the presence of the metadata.

In some embodiments, the server 102 tokenizes the input concept into an input set of tokens and, after dividing the content item into subsections, tokenizes the subsections into subsection sets of tokens. The server 102 may tokenize the input concept and/or content item into sets of tokens where each token represents a word, a letter, a character, a syllable, a sentence, or any other similar method of tokenization. In further embodiments, after tokenizing the input concept and/or content item, the server 102 embeds the input set of tokens and subsection sets of tokens into vectors using an embedding machine learning model, as described above with regard to FIGS. 1 and 2. The server 102 may then use the embedding vectors in determining the similarity metrics. Although block 404 is depicted in FIG. 4 as occurring after block 402, it will be understood that, depending on the implementation, the server 102 may divide, tokenize, and/or embed the content item and/or subsections before receiving the input concepts from the user device 104 at block 402.

In some embodiments, the content items have corrupted, incomplete, or otherwise difficult to process metadata. For example, a patent translated from another language may include metadata that an embedding machine learning model reads and interprets in generating the embedding vectors. In such implementations, the server 102 may split the content item into subsections according to a word window as described above, tokenizes the subsections, and embeds the subsection sets of tokens into embedding vectors. The server 102 then, however, averages the embedding vectors into a single embedding vector for the content item. As such, the server 102 saves computational power and minimizes the effect of bad metadata while still identifying whether the content item includes similar concepts and/or information. In other embodiments, the server 102 instead generates unique identifiers for each embedding vector and determines which embedding vectors correspond with bad metadata before removing the offending embedding vectors.

At block 406, the server 102 determines a similarity metric corresponding to the input concept for the one or more subsections of the content item. In some embodiments, the server 102 determines a similarity metric for each of the subsections and/or each subsection indicated by the user. In further embodiments, the server 102 determines the similarity metrics using one or more similarity models as described above with regard to FIGS. 1 and 2. Depending on the embodiment, the server 102 may use a predetermined similarity model, the user may choose a similarity model for the server 102 to use, or the server 102 may use a number of similarity models and select a subset of outcomes according to a predetermined metric.

In some embodiments, the server 102 generates the similarity metric for each subsection of the content item based on the embedding vectors for the subsection(s) of the content item and the input concept. For example, the server 102 may generate the similarity metric by calculating a Euclidean distance between an input vector representative of the input concept and a subsection vector representative of a subsection in the particular content item. Alternatively, the server 102 may generate the similarity metric by calculating a cosine similarity between the input vector and the subsection vector. The server 102 may generate the similarity metric such that the similarity metric includes or is a numerical similarity metric. Depending on the embodiment, the server 102 normalizes the similarity metric, as described with regard to FIG. 2. The server 102 may generate the similarity metric based on a percentage value (i.e., a subsection has a 70% match to an input concept) and display the similarity metric to the user for each subsection of the content item.

In some implementations, the server 102 generates the similarity metrics agnostic to the embedding type of the model that the server 102 uses to generate the embedding vectors so long as the embedding type is consistent between the vectors, i.e., the server 102 performs a similar process to generate similarity metrics regardless of which embedding type for an embedding machine learning model the user selects to generate the embedding vectors so long as the same type of model was used for a set of vectors to be compared. As such, the server 102 may receive embedding vector outputs from any such machine learning model described herein and subsequently generate a similarity metric based on the embedding vectors. Therefore, rather than using a single genericized model for each search to allow for comparison of results, a user may select any machine learning model and the server 102 better tailors the model to each search, allowing for greater accuracy, processing speed, efficiency, etc. By generating the similarity metrics as described herein, the system 100 allows a user to maintain a holistic search without sacrificing accuracy, processing speed, or efficiency by using a genericized model. Similarly, the server 102 may apply different machine learning models to different subsections in a content item and generate similarity metrics appropriately.

At block 408, the server 102 evaluates the similarity metric for the subsections of the content item to generate the concept score for the content item. In some embodiments, the server 102 generates the concept score for a content item by combining similarity values for the component subsections, as described above with regard to FIG. 2. In further embodiments, the server 102 assigns a weight to the similarity metric for each subsection and calculates the concept score accordingly. The weight may be determined as described with regard to FIG. 3C above. In yet further embodiments, the concept score may be equivalent to a maximum similarity value of the component subsections.

At block 410, the server 102 retrieves a set of content items based on the concept scores for the content items. In some embodiments, the server 102 only retrieves and/or the user device 104 only displays content items with concept scores above a certain threshold, such as 50%, 60%, 70%, etc. In further embodiments, a user associated with the user device 104 can modify the threshold for concept scores. In still further embodiments, the server 102 can determine particular parameters and automatically adjust the threshold in accordance with the parameters.

At block 412, the server 102 identifies one or more concept subsections of the content items in the set of content items. In some embodiments, the server 102 identifies the concept subsection(s) for a particular input concept by determining that the similarity metric for the subsection(s) in question satisfies a predetermined threshold. Depending on the embodiments, the server 102 may only identify concept subsections with a similarity metric above 50%, 60%, 70%, etc., similar to determining whether to retrieve content items. In further implementations, a user associated with the user device 104 can modify the threshold for similarity metrics. In still further implementations, the server 102 can determine particular parameters and automatically adjust the threshold in accordance with the parameters.

At block 414, the server 102 causes the user device 104 to display a particular content item in the set of content items. The display of the particular content item may include visual indicators associated with the one or more concept subsections for the particular content item. In some embodiments, the server 102 causes the user device 104 to display visual indicators of where each input concept occurs in the content items by highlighting relevant portions of the content items and/or subsections of the content items in accordance with the highlighting techniques described herein. As it is generally used herein, "highlighting" may refer to configuring the highlighting model in accordance with the techniques described herein or applying the highlighting model to render the content item with subsections highlighted in accordance with the techniques described herein. For example, the server 102 configures a highlighting model corresponding to the text of a content item such that highlighted portions cover similar text matches for the input concepts, entire subsections that include the input concept(s), etc.

In some embodiments, the server 102 or user device 104 highlights the portions of the content item related to the input concepts in different colors depending on the input concept. As such, a first subset of concept subsections corresponding to a first input concept are highlighted in a first color, a second subset of concept subsections corresponding to a second input concept are highlighted in a second color, etc. For example, in in response to detecting user input of a first input concept, concept A, a second input concept, concept B, and a third input concept, concept C, the server 102 or user device 104 may highlight concept subsections relevant to concept A in yellow, concept subsections relevant to concept B in blue, and concept subsections relevant to concept C in orange. In some embodiments, the same portion is relevant to multiple concepts, and the server 102 and/or user device 104 highlights the portion in question using multiple colors (e.g., blue and yellow stripes for both concepts A and B), a mix of the two colors (e.g., green for both concepts A and B), a separate color designated for mixes (e.g., yellow for A, blue for B, and red for both), the dominant color based on similarity metric (e.g., A has a higher score than B so yellow), a user-selected color (user is looking at input concept B so highlights blue), or any other similar technique as described herein. In further embodiments, at least one of a size, opacity, or intensity of the highlighting varies proportionally to the similarity metric for the concept subsections for the particular input concept. For example, if a subsection of a content item has a low similarity metric, the server 102 and/or user device 104 may highlight the corresponding subsection faintly. If the subsection has a high similarity metric, the highlighting may be heavier, corresponding the intensity of the highlighting to the similarity.

In some embodiments, each highlighting occurs in a separate layer, as described above with regard to FIG. 1. In further embodiments, the server 102 causes the user device 104 to display each layer as a whole in response to a user request to display the highlighting as described herein. In other embodiments, the server 102 causes the user device 104 to display portions of each layer based on the user request (e.g., a click event on a single subsection displays only the highlighted portions associated with the subsection).

Depending on the embodiment, the user device 104 displays contents of the at least one content item responsive to receiving an indication of an interaction event and/or request from a user (e.g., a click event, swipe event, tap event, etc.). In some embodiments, the user device 104 additionally or alternatively displays a visual indicator, such as the highlighting, in response to detecting an additional event and/or request from a user. In further embodiments, the content item view automatically changes to display the highlighted portion(s) as well. It will be understood that, although the visual indicator is described above with regard to highlighting, the visual indicator may similarly be comments or another visual indicator as described herein.

In some embodiments, the user device 104 displays the concept subsections based on the corresponding similarity metrics. The server 102 may also cause the user device 104 to display the similarity metric to the user for each concept subsection. In other embodiments, the server 102 causes the user device 104 to display the similarity metric to the user only after receiving an indication from the user to display subsections for a given content item (e.g., in response to a click event, tap event, swipe event, etc.). In further embodiments, the server 102 ranks the concept subsections based on the similarity metrics and causes the user device 104 to display the concept subsections in accordance with the rankings, as described with regard to FIG. 3D above.

In some scenarios, a user provides concept text in a different language than one or more of the content items. This may occur, for example when a user provides English-language concept text and the content items include patents filed with a patent office in a jurisdiction that do not utilize English (e.g., China, Japan, Germany, etc.). Accordingly, the server 102 may determine that the workspace and/or input concept is configured to utilize a first language and at least some of the content items are in a second language based on metadata associated therewith. In some embodiments, the server 102 converts, translates, and/or retrieves a translated version of the input concept from the first language to the second language and the server 102 subsequently calculates the concept score based on the second language. In other embodiments, the system 102 converts, translates, and/or retrieves a translated version of the content item(s) in the second language into the first language and calculates the concept score based on the first language. Either translation method may be performed as described with regard to FIG. 2 above.

It should be appreciated that other embodiments may include additional, fewer, or alternative functions to those described with respect to FIG. 4. For example, functions described with respect to any of FIGS. 1-3D described herein may be combined with the functions described with respect to the flow diagram 400.

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method for performing a conceptual search, the method comprising:

receiving, by one or more processors, one or more input concepts from a user device, at least one input concept of the one or more input concepts including a selection indication of a particular content section of a particular input content item selected by a user associated with the user device for which to perform a conceptual search and to which the at least one input concept corresponds, wherein the particular input content item comprises a plurality of content sections including the particular content section;

calculating, by the one or more processors, concept scores for the one or more input concepts for one or more content items, wherein calculating a concept score for an input concept for a content item includes:

dividing the content item into one or more subsections, tokenizing at least part of the particular content section of the particular input content item associated with the input concept into an input set of tokens, tokenizing the one or more subsections into one or more subsection sets of tokens, determining a similarity metric corresponding to the input concept for the one or more subsections of the content item using the input set of tokens and the one or more subsection sets of tokens, and evaluating the similarity metric for the one or more subsections of the content item to generate the concept score for the content item;

based on the concept scores for the one or more content items, retrieving, by the one or more processors, a set of content items;

identifying, by the one or more processors, one or more concept subsections of the content items in the set of content items, wherein a concept subsection is a subsection of a content item that corresponds to a particular input concept of the one or more input concepts; and causing, by the one or more processors, the user device to display a particular content item in the set of content items, wherein the display of the particular content item includes visual indicators associated with the identified one or more concept subsections for the particular content item.

2. The method of claim 1, wherein the visual indicators include highlights of text of the identified one or more concept subsections for the particular content item.

3. The method of claim 2, wherein:

a first set of concept subsections of the one or more concept subsections for the particular input concept corresponds to a first input concept;

a second set of concept subsections of the one or more concept subsections for the particular input concept corresponds to a second input concept;

the first set of concept subsections are highlighted in a first color; and the second set of concept subsections are highlighted in a second color.

4. The method of claim 1, wherein identifying the one or more concept subsections for the particular input concept comprises:

determining that the similarity metric for the identified one or more concept subsections for the particular input concept satisfy a predetermined threshold.

5. The method of claim 1, wherein at least one of a size, opacity, or intensity of the visual indicators varies proportionally to the similarity metric for the concept subsections for the particular input concept.

6. The method of claim 1, further comprising:
ranking, based on similarity metrics for the one or more concept subsections for the particular content item, the one or more concept subsections for the particular content item; and
causing the user device to display the one or more concept subsections for the particular content item in accordance with the ranking.

7. The method of claim 6, wherein:
a first set of concept subsections of the one or more concept subsections for the particular input concept corresponds to a first input concept;
a second set of concept subsections of the one or more concept subsections for the particular input concept corresponds to a second input concept; and
the ranking the one or more concept subsections for the particular content item includes the first set of concept subsections and the second set of concept subsections.

8. The method of claim 1, wherein dividing the content item into the one or more subsections is based on a window size.

9. The method of claim 1, wherein determining the similarity metric for an input concept comprises:
embedding, via an embedding machine learning model, the input set of tokens into an input vector representative of the input concept;
embedding, via the embedding machine learning model, the one or more subsection sets of tokens into one or more subsection vectors representative of the one or more subsections; and
comparing the input vector and the one or more subsection vectors to determine the similarity metric for the corresponding one or more subsections.

10. The method of claim 9, wherein comparing the input vector and a subsection vector comprises:
calculating at least one of a cosine similarity or a Euclidean distance between the input vector and the subsection vector.

11. The method of claim 9, wherein embedding the input set of tokens into the input vector comprises:
receiving an indication of a machine learning model type from the user device; and
inputting the input set of tokens into the embedding machine learning model of the indicated machine learning model type.

12. The method of claim 1, wherein:
the input concept is in a first language, and
tokenizing the one or more input concepts comprises:
determining that a subset of the one or more content items are in a second language; and
converting the input concept from the first language to the second language;
tokenizing the converted input concept.

13. The method of claim 1, wherein:
the input concept is in a first language, and
tokenizing the content item comprises:
determining that the content item is in a second language; and
converting the content item from the second language into the first language;
tokenizing the converted content item.

14. A system for performing a conceptual search, the system comprising:
one or more processors;
a non-transitory memory storing instructions that, when executed by the one or more processors, cause the system to:
receive one or more input concepts from a user device, at least one input concept of the one or more input concepts including a selection indication of a particular content section of a particular input content item selected by a user associated with the user device for which to perform a conceptual search and to which the at least one input concept corresponds, wherein the particular input content item comprises a plurality of content sections including the particular content section;
calculate concept scores for the one or more input concepts for one or more content items, wherein calculating a concept score for an input concept for a content item includes:
dividing the content item into one or more subsections,
tokenizing at least part of the particular content section of the particular input content item associated with the input concept into an input set of tokens,
tokenizing the one or more subsections into one or more subsection sets of tokens,
determining a similarity metric corresponding to the input concept for the one or more subsections of the content item using the input set of tokens and the one or more subsection sets of tokens, and
evaluating the similarity metric for the one or more subsections of the content item to generate the concept score for the content item;
based on the concept scores for the one or more content items, retrieve a set of content items;
identify one or more concept subsections of the content items in the set of content items, wherein a concept subsection is a subsection of a content item that corresponds to a particular input concept of the one or more input concepts; and
cause the user device to display a particular content item in the set of content items, wherein the display of the particular content item includes visual indicators associated with the identified one or more concept subsections for the particular content item.

15. The system of claim 14, wherein the visual indicators include highlights of text of the identified one or more concept subsections for the particular content item.

16. The system of claim 15, wherein:
a first set of concept subsections of the one or more concept subsections for the particular input concept corresponds to a first input concept;
a second set of concept subsections of the one or more concept subsections for the particular input concept corresponds to a second input concept;
the first set of concept subsections are highlighted in a first color; and
the second set of concept subsections are highlighted in a second color.

17. The system of claim 1, wherein determining the similarity metric for the input concept comprises:
embedding, via an embedding machine learning model, the input set of tokens into an input vector representative of the input concept;

embedding, via the embedding machine learning model, the one or more subsection sets of tokens into one or more subsection vectors representative of the one or more subsections; and comparing the input vector and the one or more subsection vectors to determine the similarity metric for the corresponding one or more subsections.

18. The system of claim 17, wherein comparing the input vector and a subsection vector comprises:

calculating at least one of a cosine similarity or a Euclidean distance between the input vector and the subsection vector.

* * * * *